(12) United States Patent
Houle

(10) Patent No.: US 7,428,541 B2
(45) Date of Patent: Sep. 23, 2008

(54) COMPUTER SYSTEM, METHOD, AND PROGRAM PRODUCT FOR GENERATING A DATA STRUCTURE FOR INFORMATION RETRIEVAL, AND AN ASSOCIATED GRAPHICAL USER INTERFACE

(75) Inventor: Michael Edward Houle, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/736,273

(22) Filed: Dec. 15, 2003

(65) Prior Publication Data

US 2004/0139067 A1    Jul. 15, 2004

(30) Foreign Application Priority Data

Dec. 19, 2002  (JP) .............................. 2002-368276

(51) Int. Cl.
G06F 17/00 (2006.01)
G06F 17/15 (2006.01)
G01L 15/00 (2006.01)

(52) U.S. Cl. .......................... 707/100; 707/3; 707/102; 707/200; 708/5; 704/245

(58) Field of Classification Search .............. 707/1–10, 707/100–102, 104.1, 200–201; 704/245; 706/46; 708/5

See application file for complete search history.

(56) References Cited

U.S. PATENT DOCUMENTS

| | | | | |
|---|---|---|---|---|
| 6,122,628 | A | * | 9/2000 | Castelli et al. ................. 707/5 |
| 6,138,116 | A | * | 10/2000 | Kitagawa et al. ............... 707/5 |
| 6,377,949 | B1 | * | 4/2002 | Gilmour ....................... 707/10 |
| 6,574,632 | B2 | * | 6/2003 | Fox et al. .................... 707/102 |
| 6,636,849 | B1 | * | 10/2003 | Tang et al. .................... 707/6 |
| 6,671,683 | B2 | * | 12/2003 | Kanno ........................... 707/5 |
| 6,766,316 | B2 | * | 7/2004 | Caudill et al. .................. 707/3 |
| 6,976,207 | B1 | * | 12/2005 | Ruján et al. ................. 715/500 |
| 7,007,019 | B2 | * | 2/2006 | Kanno ........................... 707/5 |
| 7,051,017 | B2 | * | 5/2006 | Marchisio ...................... 707/3 |
| 2002/0016787 | A1 | * | 2/2002 | Kanno ........................... 707/5 |
| 2002/0122078 | A1 | * | 9/2002 | Markwoski ................. 345/853 |
| 2002/0147707 | A1 | * | 10/2002 | Kraay et al. .................... 707/3 |
| 2003/0014398 | A1 | * | 1/2003 | Ohta et al. ..................... 707/3 |
| 2003/0217047 | A1 | * | 11/2003 | Marchisio ...................... 707/3 |
| 2004/0036716 | A1 | * | 2/2004 | Jordahl ....................... 345/713 |

* cited by examiner

*Primary Examiner*—Miranda Le
(74) *Attorney, Agent, or Firm*—Richard M. Goldman; Shimokaji & Associates, P.C.

(57) ABSTRACT

A computer system for generating data structures for information retrieval of documents stored in a database. The computer system includes: a neighborhood patch generation system for defining patch of nodes having predetermined similarities in a hierarchy structure. The neighborhood patch generation subsystem includes a hierarchy generation subsystem for generating a hierarchy structure upon the document-keyword vectors and a patch definition subsystem. The computer system also comprises a cluster estimation subsystem for generating cluster data of the document-keyword vectors using the similarities of patches.

7 Claims, 21 Drawing Sheets

*Profile* (query $q$; maximum patch size $m$): SCONF list *SCONFL*
    {Let *QNL* be the $m$-patch precomputed for query $q$.}
    {Let *NNL* be a list of the $m$-patches precomputed for every element of *QNL*.}
    {Initially, $w.count = \emptyset$ is assumed for every element $v$ in the data set.}
1. $score \leftarrow 0$;
    {Initially, no query neighbors are in the current patch.}
    for $i = 1$ to $m$ do
2.     $QNL[i].count \leftarrow 0$;
    end for
    for $i = 1$ to $m$ do
        {Retrieve the number of times $QNL[i]$ has been encountered as an external neighbor so far.}
3.     $score \leftarrow score + QNL[i].count$;
        {Indicate that henceforth $QNL[i]$ is in the current $i$-patch.}
4.     $QNL[i].count \leftarrow present$;
        for $j = 1$ to $i - 1$ do
5.         $w \leftarrow NNL[j, i]$;
            if $w.count = present$ then
6.             $score \leftarrow score + 1$;
            else if $w.count \geq 0$ then
7.             $w.count \leftarrow w.count + 1$;
            end if
8.         $w \leftarrow NNL[i, j]$;
            if $w.count = present$ then
9.             $score \leftarrow score + 1$;
            else if $w.count \geq 0$ then
10.            $w.count \leftarrow w.count + 1$;
            end if
        end for
11.     $w \leftarrow NNL[i, i]$;
        if $w.count = present$ then
12.         $score \leftarrow score + 1$;
        else if $w.count \geq 0$ then
13.         $w.count \leftarrow w.count + 1$;
        end if
14.     $SCONFL[i] = score/i^2$;
    end for
    {Reset the counts to their default value.}
    for $i = 1$ to $m$ do
15.     $QNL[i].count \leftarrow \emptyset$;
    end for

FIG 6

| SASH # | patch list | CONFL | SCONFL | RSCONFL |
|---|---|---|---|---|
| 0 | $NN(R_{1,0,0}, m), \ldots$ | ... | ... | ... |
| 1 | $NN(R_{1,1,0}, m), \ldots$ | ... | ... | ... |
| ... | ... | ... | ... | ... |
| h | $NN(R_{1,0,0}, m), \ldots$ | ... | ... | ... |

FIG 7

*RefineProfile* (query $q$;
              inner patch size $k_I$;
              outer patch size $k_O$): reordered query $k_I$-patch *RQNL*
{Let *QNL* be the $k_O$-patch precomputed for query $q$.}
{Let *NNL* be a list of the $k_O$-patches precomputed for every element of *QNL*.}
{Initially, $v.inpatch = false$ is assumed for every element $v$ in the data set.}
{Identify the inner patch members.}
for $i = 1$ to $k_I$ do
1.    *QNL*[$i$].*inpatch* ← *true*;
end for
{Initialize the confidence value *CONFc* of every patch element to zero.}
for $i = 1$ to $k_O$ do
2.    *CONFc*[$i$] ← 0;
end for
{For each element of the outer patch, count the number of elements
   of their $k$-nearest-neighbor sets shared with that of $q$.}
for $i = 1$ to $k_O$ do
   for $j = 1$ to $k_I$ do
3.       $w$ ← *NNL*[$i, j$];
      if $w.inpatch = true$ then
4.            *CONFc*[$i$] ← *CONFc*[$i$] + 1;
      end if
   end for
5.    *CONFc*[$i$] ← *CONFc*[$i$]/$k_O$;
end for
{Reorder the outer patch elements according to their confidence values, from highest to lowest.}
6. *RQNL* ← *sort*(*QNL*, *CONFc*, $k_O$);
{Reset the patch membership indicators to their default values.}
for $i = 1$ to $k_I$ do
7.    *QNL*[$i$].*inpatch* ← *false*;
end for

FIG 8

*PatchCluster* (data set $S$;
    RSCM parameters $a$, $b$, $m = \varphi(b)$;
    Thresholds $\alpha, \beta, \gamma, \delta$): query cluster graph $G$ 1. Randomly partition the set $S$ into subsets $S_t$ of approximate size $\frac{|S|}{2^t}$, for $0 \leq t \leq h = \lfloor \log_2 |S| \rfloor$.

2. For all $0 \leq t \leq h$ do:

(a) For every element $v \in S_t$, compute nearest-neighbor patches $\mathrm{NN}(R_t, v, m)$, where $R_t = \bigcup_{i \geq t} S_i$.

(b) For each element $v_{t,i} \in S_t$, compute the optimal query cluster size $k(v_{t,i})$ maximizing $\mathrm{RSCONF}(\mathrm{NN}(R_t, v_{t,i}, k), \varphi)$, for values of $k$ between $a$ and $b$
   The ranked collection of patches $$C_t = \langle C_{t,i} | i < j \Rightarrow \mathrm{RSCONF}(C_{t,i}, \varphi) \geq \mathrm{RSCONF}(C_{t,j}, \varphi) \rangle$$

form the candidates for the query clusters associated with sample $R_t \subseteq S$, where $C_{t,i} = \mathrm{NN}(R_t, v_{t,i}, k(v_{t,i}))$ and $C_{t,j} = \mathrm{NN}(R_t, v_{t,j}, k(v_{t,j}))$.

(c) Let $Q_t$ be a list of patches of $C_t$ that have been confirmed as query clusters of $R_t$. Initially, $Q_t$ is empty.

(d) For all $1 \leq i \leq |C_t|$ do:

i. If $\mathrm{RSCONF}(C_{t,i}, \varphi) < \alpha$, then break from the loop.

ii. For all $w \in C_{t,i}$ do: if $\mathrm{NN}(R_t, w, k) \not\subseteq |C_t|$ for any value of $k$, or failing that, if $\max\{\mathrm{CONF}(\mathrm{NN}(R_t, w, k), C_{t,i}), \mathrm{CONF}(C_{t,i}, \mathrm{NN}(R_t, w, k))\} < \beta$, then add $C_{t,i}$ to the list $Q_t$.

3. Let $h'$ be the largest index for which $|Q_{h'}| > 0$. Let $\{C_{t,j}\}$ be the set of patches comprising $Q_t$, where $C_{t,j} = \mathrm{NN}(R_t, q_{t,j}, k(q_{t,j}))\}$, for all $0 \leq t \leq h'$. Initialize the node set of the query cluster graph $G$ to contain these patches, one patch per node.

4. For all $\delta \leq t \leq h'$, all $1 \leq j \leq |Q_t|$, and all $\max\{0, t - \delta\} \leq s \leq t$, do:

(a) Compute $C'_{t,j} = \mathrm{NN}(R_s, q_{t,j}, 2^{t-s}k(q_{t,j}))\}$.

(b) For all $1 \leq i \leq |Q_s|$, if $C_{s,i} \neq C'_{t,j}$ and $\max\{\mathrm{CONF}(C_{s,i}, C'_{t,j}), \mathrm{CONF}(C'_{t,j}, C_{s,i})\} \geq \gamma$, then introduce the edges $(C_{s,i}, C_{t,j})$ and $(C_{t,j}, C_{s,i})$ into $G$, with weights $\mathrm{CONF}(C_{s,i}, C'_{t,j})$ and $\mathrm{CONF}(C'_{t,j}, C_{s,i})$, respectively.

FIG 9

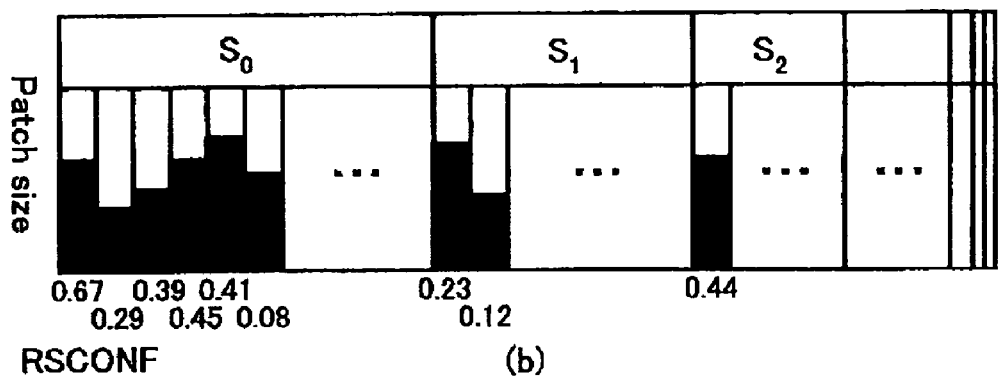
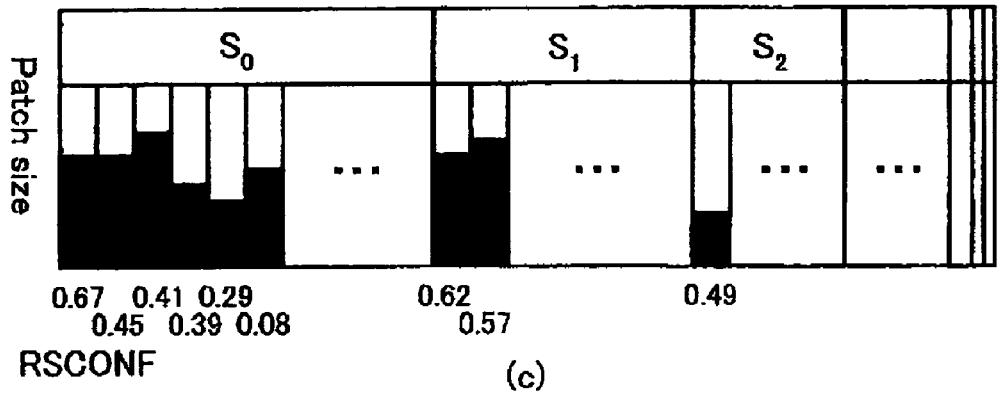
FIG 14

Patches including queried nodes
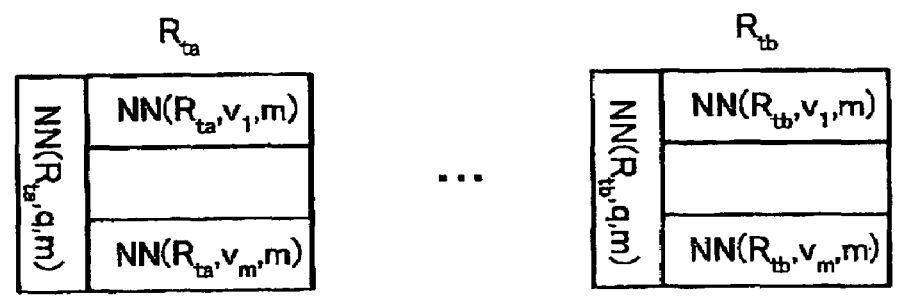
(a)
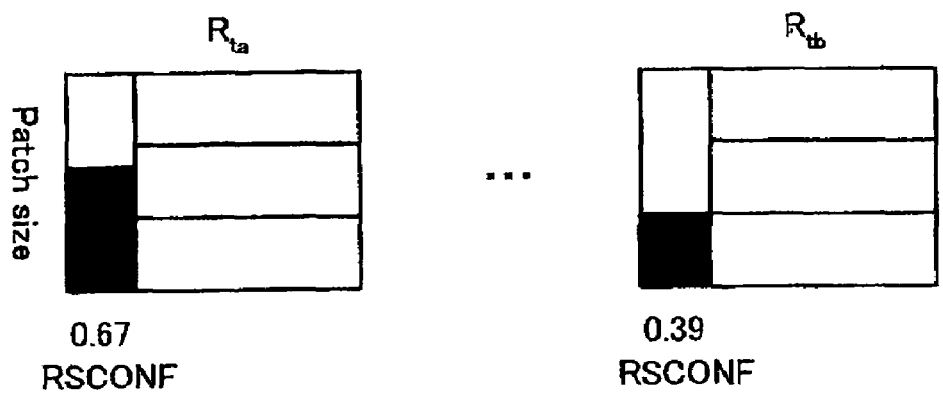
0.67
RSCONF
0.39
RSCONF
(b)
FIG 19

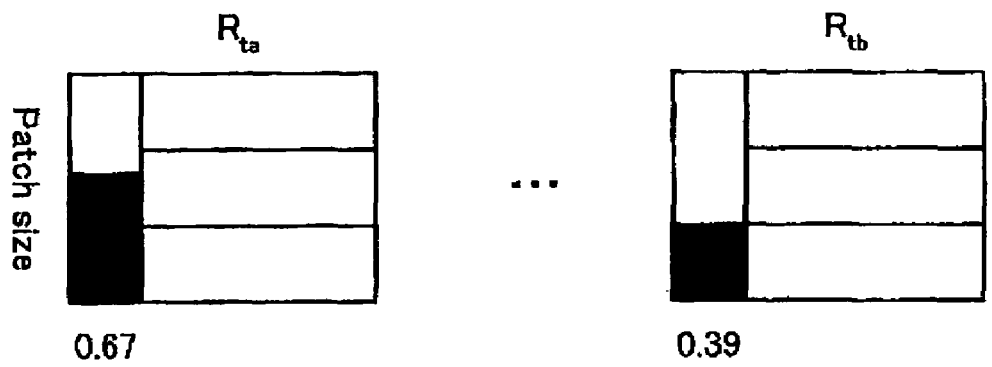
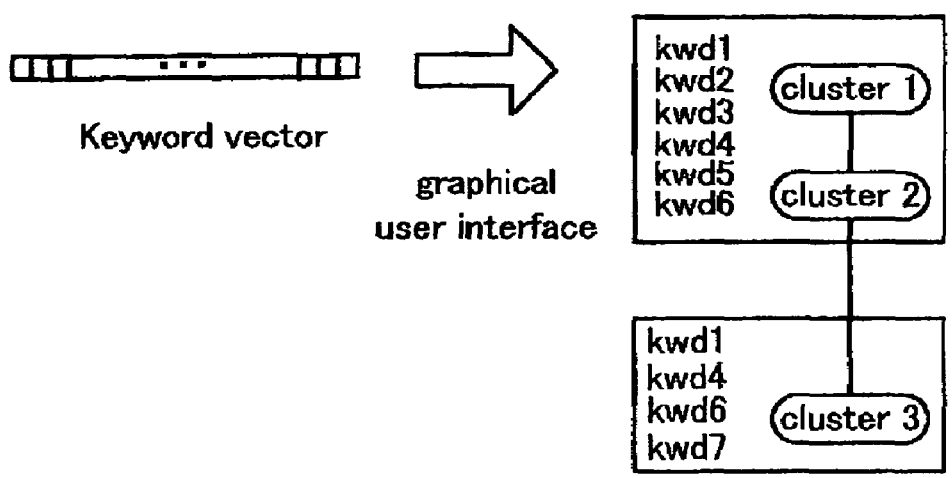
FIG 20

COMPUTER SYSTEM, METHOD, AND PROGRAM PRODUCT FOR GENERATING A DATA STRUCTURE FOR INFORMATION RETRIEVAL, AND AN ASSOCIATED GRAPHICAL USER INTERFACE

FIELD OF THE INVENTION

The present invention relates to information retrieval from a large database, and more particularly relates to a computer system for generating a data structure for information retrieval, a method thereof, a computer executable program for generating a data structure for information retrieval, a computer readable medium storing the program for generating a data structure for information retrieval, an information retrieval system, and a graphical user interface system.

BACKGROUND

Recently, information processing systems are increasingly expected to handle large amounts of data such as, for example, news data, client information, patent information, and stock market data. Users of such databases find it increasingly difficult to search for desired information quickly and effectively with sufficient accuracy. Therefore, timely, accurate, and inexpensive detection of documents from large databases may provide very valuable information for many types of businesses. In addition, sometimes users wish to obtain further information related to data retrieved, such as cluster information in the database, and the interrelationships among such clusters.

Typical methods for detecting clusters rely upon a measure of similarity between data elements; such methods based on similarity search have been proposed so far as summarized below.

Similarity search (also known as proximity search) is one in which items of a database are sought according to how well they match a given query element. Similarity (or rather, dissimilarity) is typically modeled using some real- or integer-valued distance 'metric' dist: that is, (1) $dist(p, q) \geq 0$ for all p, q (non-negativity)
(2) $dist(p, q) = dist(q, p)$ for all p, q (symmetry)
(3) $dist(p, q) = 0$ if and only if $p = q$
(4) $dist(p, q) + dist(q, r) \geq dist(p, r)$ for all p, q, r (triangle inequality).

Any set of objects for which such a distance function exists is called a metric space. A data structure that allows a reduction in the number of distance evaluations at query time is known as an index. Many methods for similarity queries have been proposed. Similarity queries on metric spaces are of two general types, as stated below:

(A) k-nearest-neighbor query: given a query element q and a positive integer k, report the k closest database elements to q.
(B) range query: given a query element q and a distance r, report every database item p such that $dist(p, q) \leq r$.

For large databases, it is too expensive to perform similarity queries by means of explicitly computing the distances from the query element to every database element. Previous computation and storage of all distances among database elements is also too expensive, as this would require time and space proportional to the square of the number of database elements (that is, quadratic time and space). A more practical goal is to construct a search structure that can handle queries in sub-linear time using sub-quadratic storage and preprocessing time.

A. Review of Vector Space Models

Current information retrieval methods often use vector space modeling to represent the documents of databases. In such vector space models, each document in the database under consideration is associated with a vector, each coordinate of which represents a keyword or attribute of the document; details of the vector space models are provided elsewhere (Gerald Salton, The SMART Retrieval System—Experiments in Automatic Document Processing, Prentice-Hall, Englewood Cliffs, N.J., USA, 1971).

B. Brief Survey of Similarity Search Structures

A great variety of structures have been proposed over the past thirty years for handling similarity queries. The majority of these are spatial indices, which require that the object set be modeled as a vector of d real-valued attributes. Others are 'metric' indices, which make no assumptions on the nature of the database elements other than the existence of a distance metric, and are therefore more widely-applicable than spatial search structures. For recent surveys of search structures for multi-dimensional vector spaces and metric spaces, see Gaede et al. (Volker Gaede and Oliver Gunther, Multidimensional Access Methods, ACM Computing Surveys, 30, 2, 1998, pp. 170-231.), and Chavez et al. (Edgar Chavez, Gonzalo Navarro, Ricardo Baeza-Yates and Jose L. Marroquin, Searching in metric spaces, ACM Computing Surveys 33, 3, 2001, pp. 273-321.).

The practicality of similarity search, whether it be on metric data or vector data, is limited by an effect often referred to as the 'curse of dimensionality'. Recent evidence suggests that for the general problem of computing nearest-neighbor or range queries on high-dimensional data sets, exact techniques are unlikely to improve substantially over a sequential search of the entire database, unless the underlying distribution of the data set has special properties, such as a low fractal dimension, low intrinsic dimension, or other properties of the distribution.

For more information regarding data dimension and the curse of dimensionality, see (for example) Chavez et al. (op cit.)), Pagel et al. (Bernd-Uwe Pagel, Flip Korn and Christos Faloutsos, Deflating the dimensionality curse using multiple fractal dimensions, Proc. 16th International Conference on Data Engineering (ICDE 2000), San Diego, USA, IEEE CS Press, 2000, pp. 589-598.), Pestov (Vladimir Pestov, On the geometry of similarity search: dimensionality curse and concentration of measure, Information Processing Letters, 73, 2000, pp. 47-51.), and Weber et al. (Roger Weber, Hans-J. Schek and Stephen Blott, A quantitative analysis and performance study for similarity-search methods in high-dimensional spaces, Proc. 24th VLDB Conference, New York, USA, 1998, pp. 194-205).

C. Brief Survey of Approximate Similarity Searching

In an attempt to circumvent the curse of dimensionality, researchers have considered sacrificing some of the accuracy of similarity queries in the hope of obtaining a speed-up in computation. Details of these techniques are provided elsewhere, for example, by Indyk et al. (P. Indyk and R. Motwani, Approximate nearest neighbors: towards removing the curse of dimensionality, Proc. 30th ACM Symposium on Theory of Computing, Dallas, 1998, pp. 604-613.), and Ferhatosmanoglu et al. (Hakan Ferhatosmanoglu, Ertem Tuncel, Divyakant Agrawal and Amr El Abbadi, Approximate nearest neighbor searching in multimedia databases, Proc. 17th International Conference on Data Engineering (ICDE), Heidelberg, Germany, IEEE CS Press, 2001, pp. 503-514.); for metric spaces, by Ciaccia et al. (Paolo Ciaccia and Marco Patella, PAC nearest neighbor queries: approximate and controlled search in high-dimensional and metric spaces, Proc. 16th International Conference on Data Engineering (ICDE 2000), San Diego, USA, 2000, pp. 244-255; Paolo Ciaccia, Marco Patella and Pavel Zezula, M-tree: an efficient access method for similarity search in metric spaces, Proc. 23rd VLDB Conference, Athens, Greece, 1997, pp. 426-435.) and Zezula et al. (Pavel Zezula, Pasquale Savino, Giuseppe Amato and Fausto Rabitti, Approximate similarity retrieval with M-trees, The VLDB Journal, 7, 1998, pp. 275-293.). However, these methods all suffer from deficiencies that limit their usefulness in practice. Some make unrealistic assumptions concerning the distribution of the data; others cannot effectively manage the trade-off between accuracy and speed.

D. Spatial Approximation Sample Hierarchy (SASH)

An approximate similarity search structure for large multi-dimensional data sets that allows significantly better control over the accuracy-speed tradeoff is the spatial approximation sample hierarchy (SASH), described in Houle (Michael E. Houle, SASH: a spatial approximation sample hierarchy for similarity search, IBM Tokyo Research Laboratory Research Report RT-0446, 18 pages, Feb. 18, 2002) and Houle, Kobayashi and Aono (Japanese Patent Application No. 2002-037842). The SASH requires a similarity function satisfying the conditions of a distance metric, but otherwise makes no assumptions regarding the nature of the data. Each data element is given a unique location within the structure, and each connection between two elements indicates that they are closely related. Each level of the hierarchy consists of a random sample of the elements, the sample size at each level roughly double that of the level immediately above it. The structure is organized in such a way that the elements located closest to a given element v are those that are most similar to v. In particular, the node corresponding to v is connected to a set of its near neighbors from the level above, and also to a set of items from the level below that choose v as a near neighbor.

E. Review of Clustering Techniques

The term clustering refers to any grouping of unlabeled data according to similarity criteria. Traditional clustering methods can generally be classified as being either partitional or hierarchical. Hierarchical techniques produce a tree structure indicating inclusion relationships among groups of data (clusters), with the root of the tree corresponding to the entire data set. Partitional techniques typically rely on the global minimization of classification error in distributing data points among a fixed number of disjoint clusters. In their recent survey, Jain, Murty and Flynn (A. K. Jain, M. N. Murty and P. J. Flynn, Data clustering: a review, ACM Computing Surveys 31, 3, 1999, pp. 264-323.) argue that partitional clustering schemes tend to be less expensive than hierarchical ones, but are also considerably less flexible. Despite being simple, fast (linear observed time complexity), and easy to implement, even the well-known partitional algorithm K-means and its variants generally do not perform well on large data sets. Partitional algorithms favor the generation of isotropic (rounded) clusters, but are not well-suited for finding irregularly-shaped ones.

F. Hierarchical Agglomerative Clustering

In a hierarchical agglomerative clustering, each data point is initially considered to constitute a separate cluster. Pairs of clusters are then successively merged until all data points lie in a single cluster. The larger cluster produced at each step contains the elements of both merged sub clusters; it is this inclusion relationship that gives rise to the cluster hierarchy. The choice of which pairs to merge is made so as to minimize some inter-cluster distance criterion.

G Shared-neighbor Methods

One of the criticisms of simple distance-based agglomerative clustering methods is that they are biased towards forming clusters in regions of higher density. Well-associated groups of data in regions of low density risk not being discovered at all, if too many pair wise distances fall below the merge threshold. More sophisticated (and expensive) distance measures for agglomerative clustering have been proposed, that take into account the neighborhoods of the data elements. Jarvis et al. (R. A. Jarvis and E. A. Patrick, Clustering using a similarity measure based on shared nearest neighbors, IEEE Transactions on Computers C-22, 11, Nov. 1973, pp. 1025-1034.) defined a merge criterion in terms of an arbitrary similarity measure dist and fixed integer parameters $k>r>0$, in which two data elements find themselves in the same cluster if they share at least a certain number of nearest neighbors. The decision as to whether to merge clusters thus does not depend on the local density of the data set, but rather as to whether there exists a pair of elements, one drawn from each, that share a neighborhood in a substantial way.

Jarvis and Patrick's method (op. cit.) is agglomerative, and resembles the single-link method in that it tends to produce irregular clusters via chains of association. More recent variants have been proposed in an attempt to vary the qualities of the clusters produced: for example, by Guha et al. (S. Guha, R. Rastogi and K. Shim, ROCK: a robust clustering algorithm for categorical attributes, Information Systems 25, 5, 2000, pp. 345-366.); by Ertoz et al. (Levent Ertoz, Michael Steinbach and Vipin Kumar, Finding topics in collections of documents: a shared nearest neighbor approach, University of Minnesota Army HPC Research Center Preprint 2001-040, 8 pages, 2001.); by Ertoz et al. (Levent Ertoz, Michael Steinbach and Vipin Kumar, A new shared nearest neighbor clustering algorithm and its applications, Proc. Workshop on Clustering High Dimensional Data and its Applications (in conjunction with 2nd SIAM International Conference on Data Mining), Arlington, Va., USA, 2002, pp. 105-115.); by Daylight Chemical Information Systems Inc., in URL address (http://www.daylight.com/); and by Barnard Chemical Information Ltd., in URL address (http://www.bci.gb-.com/). Nonetheless, all variants still exhibit the main characteristics of agglomerative algorithms, in that they allow the formation of large irregularly-shaped clusters with chains of association bridging poorly-associated elements.

H. Review of Methods for Dimension Reduction

Latent semantic indexing (LSI) is a vector space model-based algorithm for reducing the dimension of the document ranking problem; see Deerwester et al. (Scott Deerwester, Susan T. Dumais, George W. Furnas, Richard Harshman, Thomas K. Landauer, Karen E. Lochbaum, Lynn A. Streeter, Computer information retrieval using latent semantic analysis, U.S. Pat. No. 4,839,853, filed Sep. 15, 1988, issued Jun. 13, 1989; Scott Deerwester, Susan T. Dumais, George W. Furnas, Thomas K. Landauer, Richard Harshman, Indexing by latent semantic analysis, Journal of the American Society for Information Science, 41, 6, 1990, pp. 391-407.). LSI reduces the retrieval and ranking problem to one of significantly lower dimension so that retrieval from very large databases can be performed more efficiently. Another dimension-reduction strategy due to Kobayashi et al. (Mei Kobayashi, Loic Malassis, Hikaru Samukawa, Retrieval and ranking of documents from a database, IBM Japan, docket No. JP9-2000-0075, filed Jun. 12, 2000; Loic Malassis, Mei Kobayashi, Statistical methods for search engines, IBM Tokyo Research Laboratory Research Report RT-413, 33 pages, May 2, 2001.) provides a dimensional reduction method called COV, which uses the covariance matrix of the document vectors to determine an appropriate reduced-dimensional space into which to project the document vectors. LSI and COV are comparable methods for information retrieval; for some databases and some queries, LSI leads to slightly better results than COV, while for others, COV leads to slightly better results.

PROBLEM TO BE SOLVED BY INVENTION

Conventional cluster detection based on distances has other inconveniences as described herein below:

The usual clustering methods for machine learning contexts are designed to find major groupings within data sets. Here, a method is considered good if the clusters allow unknown points to be classified with high accuracy. However, in data mining contexts, the major clusters of the data are often well understood by users, and it is the smaller, minor clusters that have the potential of revealing valuable nuggets of information. Existing clustering techniques based on partition or agglomeration are largely ineffective at separating out small data clusters from their background.

There is another inconvenience that massive text databases are typically partitioned into smaller collections in order to increase the efficiency of information retrieval operations. This distribution is usually performed so that the largest clusters in the data set remain intact within a single database. However, partition methods that focus on major clusters may cause valuable minor clusters to be dispersed among several databases. Identifying minor clusters as well as major clusters can lead to partitions that more effectively preserve minor clusters.

As described before, some users of clustering tools are often interested in knowing the relationships among the clusters produced by the tool. Hierarchical clustering algorithms attempt to fill this need by producing a nested collection of clusters, with a single cluster containing the entire data set at the top, and the smallest clusters at the bottom. However, many of these clusters may exist only as a byproduct of the hierarchical organization, and have no useful interpretation of their own. Users would primarily expect each cluster reported by a data mining tool to have some independent conceptual interpretation. Once a set of meaningful clusters has been identified, users would likely be interested in knowing of any overlap or inclusion relationships among them.

In addition, in multi-dimensional settings it is very difficult to represent or describe the associative qualities of data clusters in a way that is easy for users to understand. When browsing clustered data, users need to be able to assess the degree of cohesion and prominence of clusters at a glance.

With respect to hardware resources for the retrieval, clustering has generally been viewed as desirable yet impractical for data mining applications, due to the computation cost associated with achieving high-quality clusters when the data sets are very large. There is a tremendous demand for tools that can provide some insight into the organization of large data sets in reasonable time on an ordinary computer.

As described above, many methods has been proposed so far. Nevertheless, a novel data structure suitable for information retrieval with high efficiency, high speed together with sufficient scalability has been required in the art.

SUMMARY OF THE INVENTION

The present invention hereby proposes a system and a method for information retrieval and data mining of large text databases, based on the identification of clusters of elements (e.g. documents) that exhibit a high degree of mutual similarity relative to their background.

In the present invention, profiles of clusters can be graphically displayed to the user, providing immediate visual feedback as to their quality and significance. Cluster attributes such as size and quality are assessed automatically by the system. The system also allows users to query the data set for clusters without the need for a precomputed global clustering. Scalability is achieved by means of dimensional reduction techniques, random sampling, and the use of data structures supporting approximate similarity search.

The present invention provides the above-described novel information retrieval features by improving detection efficiency of minor clusters while preserving such minor clusters. The novel information retrieval according to the present invention allows the interrelations of the clusters to be expressed as a graph structure to aid user understanding of the clusters. The present invention further makes it possible to improve the computation scalability of the computation of information retrieval.

The above aspects are provided by a system and methods for information retrieval and data mining of text databases, using shared neighbor information to determine query clusters. The clustering method assesses the level of mutual association between a query element (which may or may not be an element of the data set) and its neighborhood within the data set. The association between two elements is considered strong when the elements have a large proportion of their nearest neighbors in common. In contrast with previous methods making use of shared-neighbor information, the proposed methods are based on the new and original concepts of inter-cluster association confidence (CONF) and intra-cluster association self-confidence (SCONF).

According to the present invention, a computer system is provided for generating data structures for information retrieval of documents stored in a database, the documents being stored as document-keyword vectors generated from a predetermined keyword list, and the document-keyword vectors forming nodes of a hierarchical structure imposed upon the documents. The computer system comprises:

a neighborhood patch generation subsystem for generating groups of nodes having similarities as determined using a search structure, the patch generation subsystem including a subsystem for generating a hierarchical structure upon the document-keyword vectors and a patch defining subsystem for creating patch relationships among said nodes with respect to a metric distance between nodes; and a cluster estimation subsystem for generating cluster data of the document-keyword vectors using the similarities of patches.

According to the present invention, the computer system comprises a confidence determination subsystem for computing inter-patch confidence values between the patches and intra-patch confidence values, and the cluster estimation subsystem selects the patches depending on the inter-patch confidence values to represent clusters of the document-keyword vectors.

According to the present invention, the cluster estimation subsystem estimates sizes of the clusters depending on the intra-patch confidence values.

According to the present invention, a method is provided for generating data structures for information retrieval of documents stored in a database, the documents being stored as document-keyword vectors generated from a predetermined keyword list, and the document-keyword vectors forming nodes of a hierarchical structure imposed upon the documents. The method comprises the steps of:

generating a hierarchical structure upon the document-keyword vectors, and storing hierarchy data in an adequate storage area;

generating neighborhood patches consisting of nodes having similarities as determined using levels of the hierarchical structure, and storing the patches in an adequate storage area;

invoking the hierarchy data and the patches to compute inter-patch confidence values between the patches and intra-patch confidence values, and storing the values as corresponding lists in an adequate storage area; and selecting the patches depending on the inter-patch confidence values and said intra-patch confidence values to represent clusters of the document-keyword vectors.

According to the present invention, a program may be provided for making a computer system execute a method for generating data structures for information retrieval of documents stored in a database, the documents being stored as document-keyword vectors generated from a predetermined keyword list, and the document-keyword vectors forming nodes of a hierarchical structure imposed upon the documents. The program makes the computer system execute the steps of:

generating a hierarchical structure upon the document-keyword vectors and storing hierarchy data in an adequate storage area;

generating neighborhood patches consisting of nodes having similarities as determined using levels of the hierarchical structure, and storing the patches in an adequate storage area;

invoking the hierarchy data and the patches to compute inter-patch confidence values between the patches and intra-patch confidence values, and storing the values as corresponding lists in an adequate storage subsystem; and selecting the patches depending on the inter-patch confidence values and intra-patch confidence values to represent clusters of the document-keyword vectors.

According to the present invention, a computer readable medium may be provided for storing a program for making a computer system execute a method for generating data structures for information retrieval of documents stored in a database, the documents being stored as document-keyword vectors generated from a predetermined keyword list, and the document-keyword vectors forming nodes of a hierarchical structure imposed upon the documents. The program makes the computer system execute the steps of:

generating a hierarchical structure upon the document-keyword vectors and storing hierarchy data in an adequate storage area;

generating neighborhood patches consisting of nodes having similarities as determined using levels of the hierarchical structure, and storing the patch list in an adequate storage area;

invoking the hierarchy data and the patches to compute inter-patch confidence values between the patches and intra-patch confidence values, and storing the values as corresponding lists in an adequate storage area; and selecting the patches depending on the inter-patch confidence values and intra-patch confidence values to represent clusters of the document-keyword vectors.

According to the present invention an information retrieval system may be provided for documents stored in a database, the documents being stored as document-keyword vectors generated from a predetermined keyword list, and the document-keyword vectors forming nodes of a hierarchical structure imposed upon the documents. The system comprises:

a neighborhood patch generation subsystem for generating groups of nodes having similarities as determined using a hierarchical structure, the patch generation subsystem including a subsystem for generating a hierarchical structure upon the document-keyword vectors and a patch defining subsystem for creating patch relationships among said nodes with respect to a metric distance between nodes; and a cluster estimation subsystem for generating cluster data of the document-keyword vectors using the similarities of patches; and a graphical user interface subsystem for presenting the estimated cluster data on a display means.

According to the present invention, the information retrieval system comprises a confidence determination subsystem for computing inter-patch confidence values between the patches and intra-patch confidence values, and the cluster estimation subsystem selects the patches depending on the inter-patch confidence values to represent clusters of the document-keyword vectors. According to the present invention, the cluster estimation subsystem estimates sizes of the clusters depending on the intra-patch confidence values. According to the present invention, the system further comprises a user query receiving subsystem for receiving the query and extracting data for information retrieval to generate a query vector, and an information retrieval subsystem for computing similarities between document-keyword vectors and the query vector to select the document-keyword vectors. The clusters are estimated using the retrieved document-keyword vectors with respect to the user input query.

According to the present invention, a graphical user interface system for graphically presenting estimated clusters on a display device in response to a user input query may be provided. The graphical user interface system comprising:

a database for storing documents;

a computer for generating document-keyword vectors for the documents stored in the database and for estimating clusters of documents in response to the user input query; and a display for displaying on screen the estimated clusters together with confidence relations between the clusters and hierarchical information pertaining to cluster size.

According to the present graphical user interface, the computer comprises a neighborhood patch generation subsystem for generating groups of nodes having similarities as determined using a search structure, the neighborhood patch generation subsystem including a subsystem for generating a hierarchical structure upon the document-keyword vectors and a patch defining subsystem for creating patch relationships among the nodes with respect to a metric distance between nodes; and a cluster estimation subsystem for generating cluster data of the document-keyword vectors using the similarities of patches. Further according to the present invention, the computer comprises a confidence determination subsystem for computing inter-patch confidence values between the patches and intra-patch confidence values, and the cluster estimation subsystem selects the patches depending on the inter-patch confidence values to represent clusters of the document-keyword vectors and the cluster estimation subsystem estimates sizes of the clusters depending on the intra-patch confidence values.

THE FIGURES

Various aspects and exemplifications of my invention are illustrated in the figures appended hereto.

FIG. 6 is a sample pseudo-code listing for the computation of SCONFL.

FIG. 7 is an illustration of the structure of patch and self-confidence storage.

FIG. 8 is a sample pseudo-code listing for the refinement of patch profiles.

FIG. 9 is a sample pseudo-code listing for PatchCluster (including patch ranking and selection).

FIG. 14 is a graphical representation of the data structures relevant to the process of Scenario A shown in FIG. 12.

FIG. 19 is a graphical representation of the data structures relevant to the process of Scenario B shown in FIG. 18.

FIG. 20 is a graphical representation of the data structures relevant to the process of Scenario B shown in FIG. 18.

DETAILED DESCRIPTION OF THE INVENTION

Part I.—Processes of the Method

Hereinafter, the present invention will be explained in the context of information retrieval of documents; however, the present invention is not limited thereto and the algorithm of the present invention can be adapted for any application for which a pair wise dissimilarity measure is used that satisfies the properties of a distance metric (with the possible exception of the triangle inequality), and for which each data element has keywords or other information that can be used for annotation purposes. One example of such an application is a data mining system for multimedia databases (e.g., databases with contents which consist of text, audio, video, still images, graphics images, graphics videos, and/or gif animations, etc.) having contents for which such a pair wise dissimilarity metric exists.

Figure 1:
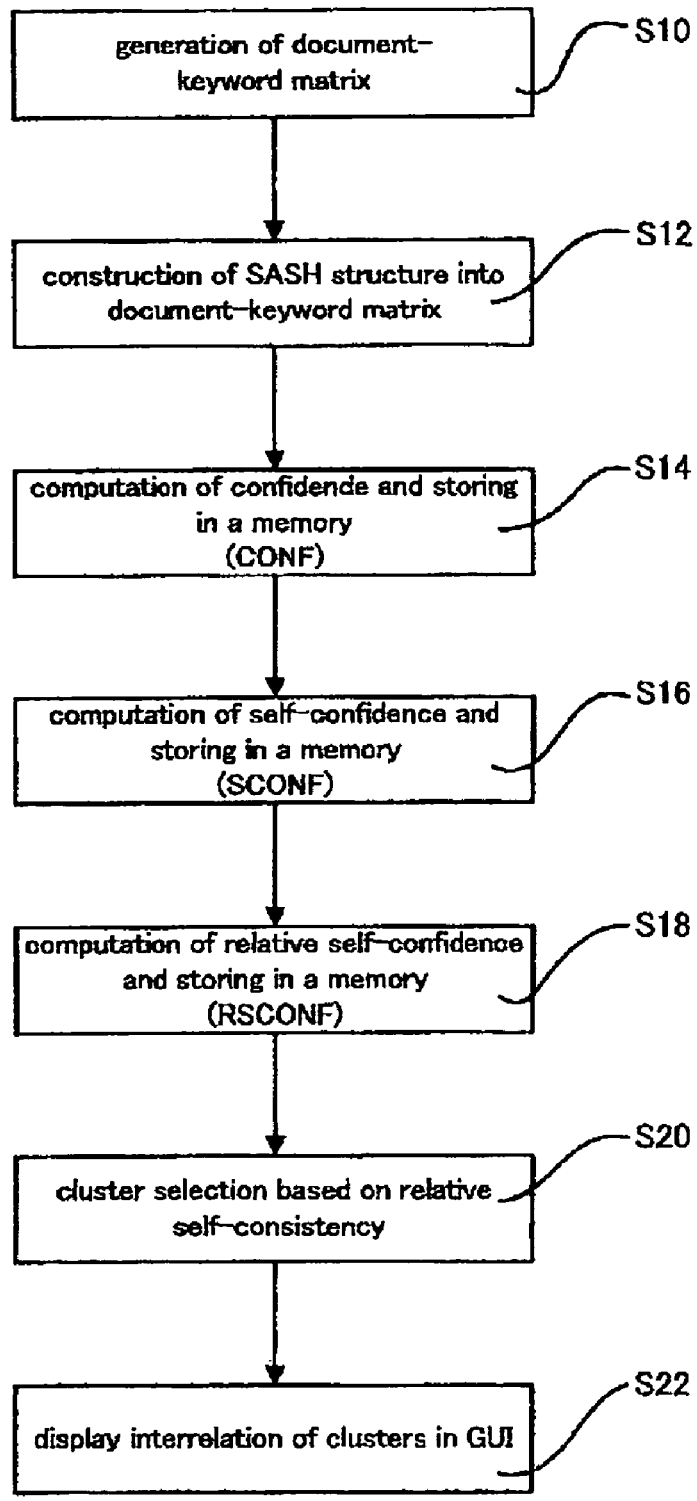
FIG. 1 is a flowchart of the method for constructing data structures according to the present invention.

A flowchart of the general method according to the present invention is shown in FIG. 1.

Although the present invention is primarily explained using an application to for texts, a person skilled in the art may understand that the methods of the present invention are easily adapted to any database with contents which may be modeled with a clearly defined metric that enables computation of distances between any two elements so that pairs of elements which are "closer" (with respect to the metric) are more similar than pairs of elements that are "further apart".

The method of the present invention begins from the step S10 where documents in a database are transformed into vectors using the vector space model. Next, the method generates in the step S12 a SASH similarity search structure for the data stored in the database. Next, for every element of the database, the SASH structure is used in the step S14 to compute a neighborhood patch consisting of a list of those database elements most similar to it. These patches are then stored in an adequate memory area.

In the step S16, a list of self-confidence values, hereafter referred to as SCONF values, are computed for every stored patch. These SCONF values are used to compute relative self-confidence values, hereafter referred to as RSCONF values, that are in turn used to determine the size of the best subset of each patch (which is itself also a patch) to serve as a cluster candidate. Next, the method proceeds to the step S18, at which confidence values, hereafter referred to as CONF values, are used to eliminate redundant cluster candidates. The method then proceeds to the Step S20 for further selection of those cluster candidates having at least a desired minimum value of RSCONF as the final clusters, and storing these selected clusters in an adequate memory. The method further proceeds to the step S22 to display to the user by a GUI interface on a computer screen a graph indicating the interrelationships among the clusters. The method of FIG. 1 further comprises sub-steps for performing each step of FIG. 1, and the sub-steps will hereinafter be described in detail.

Computation of Document-Keyword Vectors

Document-keyword vectors may be computed from given keywords and documents using any of several known techniques. In a particular embodiment of the present invention, appropriate weighting is used to digitize the documents; details of the digitization has been provided elsewhere (e.g. Salton et al., op. cit), and therefore are not explained in the present invention.

SASH Construction and Usage

Figure 2:
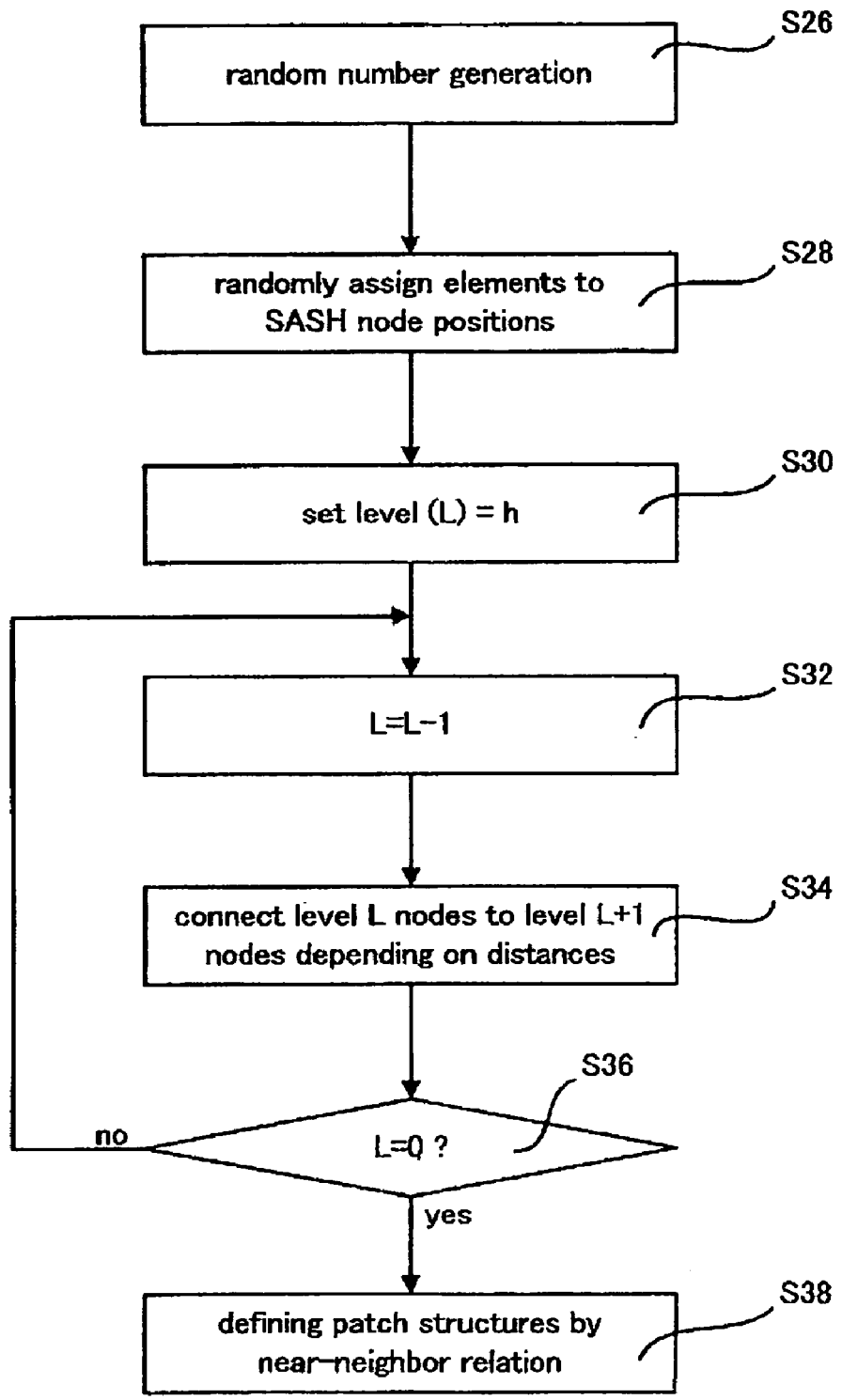
FIG. 2 is a simplified flowchart of the process for constructing the SASH structure.

FIG. 2 shows a general procedure for constructing the hierarchical structure of the document-keyword vectors known as a spatial approximation sample hierarchy, or SASH. The process begins at the step S28 after receiving the result of the step S10 of FIG. 1 to generate a random assignment of vectors to nodes of the SASH using, for example, any well-known random number generating program. The levels are numbered from 0 to h, where each level contains roughly twice as many vector nodes as the one following it. The level numbered 0 contains roughly half the vector nodes of the data set, and the level numbered h contains a single node, called the top node. The top node of the SASH structure is determined randomly using any random number generation means included elsewhere in the computer system. Next, in the step S30, a hierarchy level reference L is initialized to h. The process proceeds to the step S32 to decrease the hierarchy level L by 1 and in the step S34 level L nodes are connected to a set of level L+1 nodes depending on distances between the nodes. In the above connection, the nodes at level L+1 become parent nodes and the nodes at level L become child nodes. The connection is performed by choosing parents of a node from level L from among the closest nodes from level L+1, and then connecting these parent-child node pairs so that each parent is connected to a predetermined number of its closest children. Further details on how the connections are performed are given elsewhere, by Houle et al. (op. cit). The process proceeds to the step S36 and determines whether or not the hierarchy level reaches to the lowest level (0), and if so (yes), the construction of the SASH is completed and the SASH structure is stored in an adequate memory area such as memory or a hard disk. The process continues to the step S38 to construct patches of nodes. If not so (no), the process reverts to the step S32 to repeat until an affirmative result in the step S36 is obtained.

In the step 38, the stored SASH structure is used according to the present invention to generate a patch for every element of the database. A patch for a given element q with respect to a subset R of the database is a set of neighboring elements of q drawn from R, according to a predetermined measure of similarity dist. In the described embodiment for constructing the SASH, each node in the database are labeled with its hierarchy level, and the patch for each node is of a predetermined, fixed size, and is computed with respect to the set of all nodes at the same level or greater. The present invention is not limited to constructing and storing only one patch per node; additional patches with respect to other node sets may also be constructed and stored.

Figure 3:
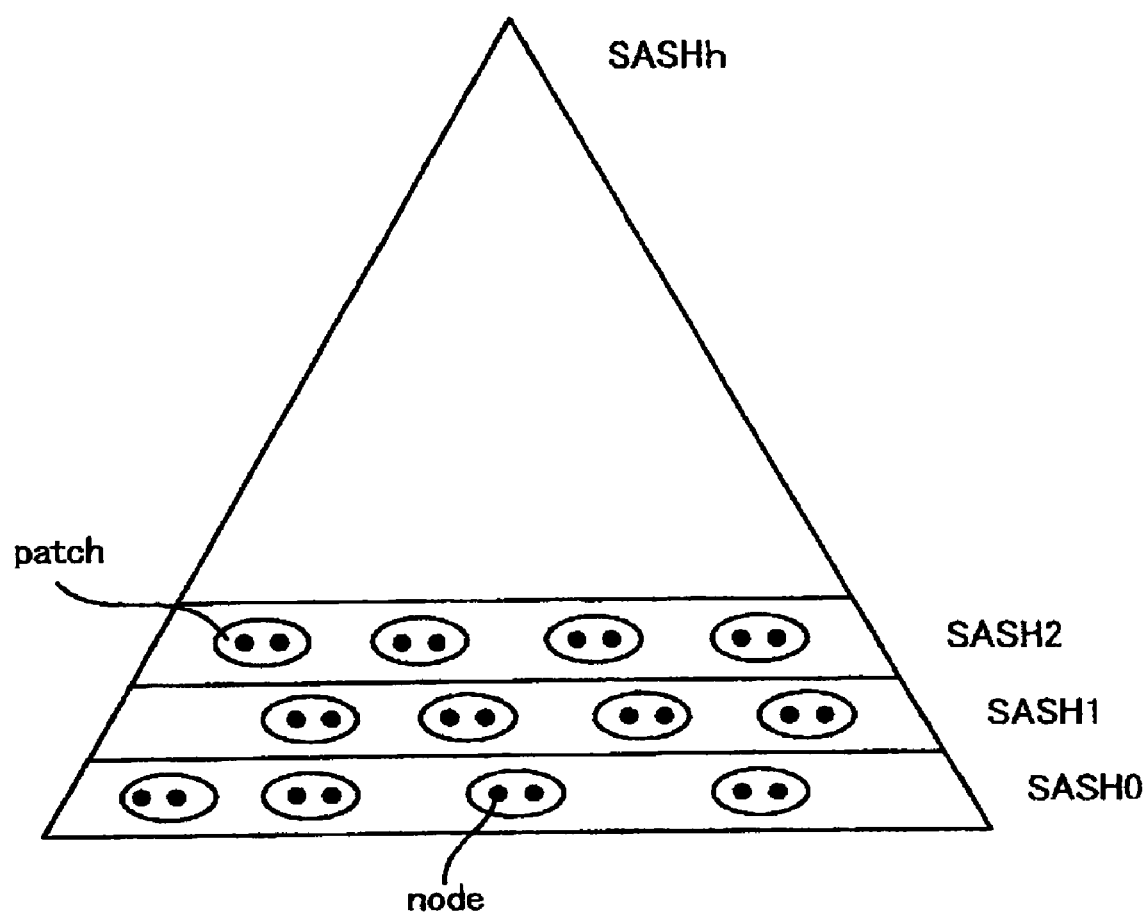
FIG. 3 is a schematic construction of the SASH with patch structures.

FIG. 3 shows an illustrative example of construction of the SASH structure together with the structure of the patch created according to the present invention. As described in FIG. 3, the vector nodes referred to by a patch can essentially belong to any of the SASH hierarchy levels at or above the level of the vector node upon which it is based. In addition, from among the nodes at these hierarchy levels, patches contain the nodes closest to the base node according to a predetermined "metric distance". The base node may be selected from any or all nodes included in the hierarchical structure so as to provide global constructions of clusters; in an alternative embodiment of the present invention, the base node may be determined using a user inputted query so as to provide cluster information specifically about the queried base node, i.e., a retrieved document. The base node is represented by the star in FIG. 3 and the nodes in the patch are aligned with respect to the user query as shown in FIG. 3. The patch structure is also stored in an adequate memory area in the system described in detail hereinafter. In the present invention, these patches are further related in terms of confidence, as described below.

Computation of Confidences

The method of the present invention uses a novel model for clustering that borrows from both information retrieval and association rule discovery herein named the "patch model". The patch model assumes that data clusters can be represented as the results of neighborhood queries based on elements from the data set, according to some measure of (dis)similarity appropriate to the domain. More formally, let S be a database of elements drawn from some domain D, and now, let "dist" be a pair wise distance function defined on D satisfying the properties of a metric, as defined earlier. Further now, let R be a subset of S. For any given query pattern q∈D, let NN(R, q, k) which denote a k-nearest neighbor set of q, drawn from R according to dist, and chosen subject to the following conditions:

If q∈R, then NN(R, q, 1)={q}, that is, if q is a member of the data set, then q is considered to be its own nearest neighbor.

NN(R, q, k−1) included within NN(R, q, k) for all 1<k≦|R|, that is, smaller neighborhoods of q are strictly contained in larger neighborhoods.

These conditions take into account the possibility that q may have more than one distinct k-nearest neighbor set in R. The uniquely-determined set NN(R, q, k) is referred as the k-patch of q (relative to R), or simply as one of the patches of q.

Figure 4:
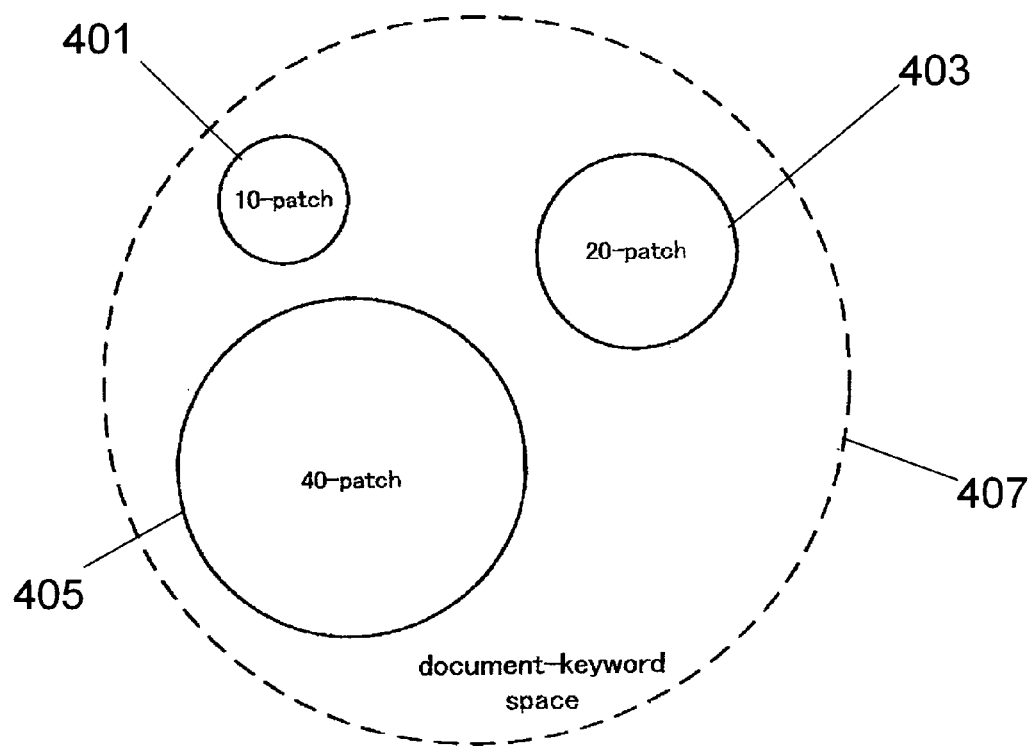
FIG. 4 is a sample diagram of the patches according to the present invention.

FIG. 4 illustrates a collection of patches (a 7patch 401, a 12patch 403, and an 18patch 405) of a database. The dashed circle 407 represents the entire document space.

Consider now the situation in which two potential clusters within R are represented by the two patches Ci=NN(R, qi, ki) and Cj=NN(R, qj, kj). The relevance of Cj to Ci is assessed according to a natural confidence measure resembling that of association rule discovery proposed by Agrawal and Srikant (op. cit):

$$CONF(Ci,Cj)=|Ci \cap Cj|/|Ci|=|NN(R, qi, ki) \cap NN(R, qj, kj)|/ki.$$

That is, the confidence is expressed as the proportion of elements forming Ci that also contribute to the formation of Cj. If the confidence value is small, the candidate Cj has little or no impact upon Ci; on the other hand, if the proportion is large, Cj is strongly related to Ci, possibly even subsuming it.

Figure 5:
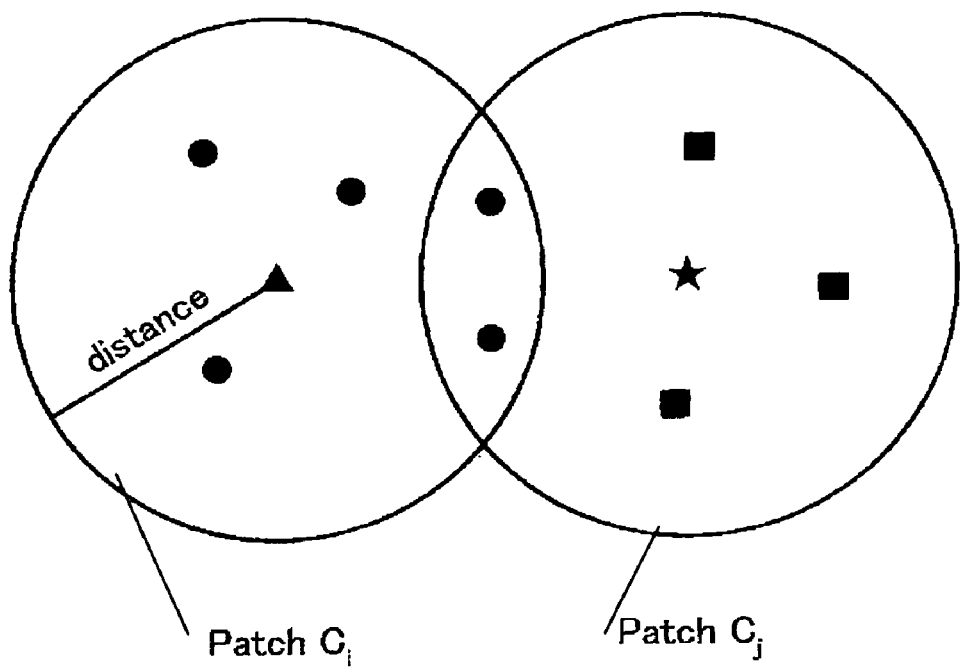
FIG. 5 is a representative example of the computation of the confidence function CONF.

FIG. 5 shows an essential function of CONF to the clusters $C_i$ and $C_j$ which include 8 and 10 vectors, respectively. Two vectors are in the common intersection of $C_i$ and $C_j$, and therefore when the function CONF is applied to the patches in the order $C_i$, $C_j$, that is, CONF $C_i$, $C_j$), the result is 0.25 or 25%. When the function is applied in the order $C_j$, $C_i$, that is, CONF $C_j$, $C_i$), the result is 0.2 or 20%. The function CONF can be applied to any two patches drawn from a common underling sample of the database.

The confidence measure can also be regarded as an example of a shared-neighbor distance metric. However, the uses to which the shared-neighbor information are put in this invention are very different from those of agglomerative clustering methods: whereas agglomerative methods use such metrics to decide whether two patches should be merged, the proposed method uses it to assess the quality of the level of association between two query patches.

<Computation of Intra-Cluster Association>

A natural assessment of association within patches is also possible in terms of the notion of confidence. Let Cq=NN(R, q, k) be a patch cluster candidate. Here the constituent patches of Cq is defined to be the set of those patches of the form Cv=NN(R, v, k), for all elements v □ Cq. If Cq has a high degree of internal association, then one can reasonably expect strong relationships between Cq and its constituent patches. On the other hand, low internal association would manifest itself as weak relationships between Cq and its constituent patches. Therefore, internal association within a patch cluster candidate in terms of its self-confidence is obtained and is defined as the average confidence of the candidate patches with respect to its constituent patches:

$$SCONF(Cq)=(1/|Cq|)*\Sigma v \text{ included within } Cq, |Cv|=|Cq| CONF(Cq,Cv)=(1/k2)*\Sigma v \text{ included within } Cq |NN(R, q, k) \cap NN(R, v, k)|.$$

A self-confidence value of 1 indicates perfect association among all elements of a cluster, whereas a value approaching 0 indicates little or no internal association.

Cluster Boundary Determination Using Intra-cluster Confidence

Herein assume for the moment that the subject node q is associated with some cluster within R that we want to estimate. Using the notion of self-confidence, the process determines the k-patch based at q that best describes this cluster, over some range of interest a□k□b. The ideal patch would be expected to consist primarily of cluster elements, and to have a relatively high self-confidence, whereas larger patches would be expected to contain many elements from outside the cluster and to have a relatively low self-confidence. The evaluation focuses on two patches: an inner patch Cq,k=NN(R, q, k) of size k indicating a candidate patch cluster, and an outer patch Cq, φ(k)=NN(R, q, φ(k)) of size φ(k)>k that provides the local background against which the suitability of the inner patch will be judged.

For a given choice of k, the neighbor sets of each element of the outer patch are examined. Consider the neighbor pair (v,w) with v in the outer patch, and w a member of the outer constituent patch NN(R, v, φ(k)). If v also lies in the inner patch, and w is a member of the inner constituent patch NN(R, v, k), then herein (v,w) is referred to as an inner neighbor pair.

If w is a member of the outer patch, then the pair (v,w) contributes to the self-confidence of the outer patch, thereby undermining the choice of the inner patch as the descriptor for the cluster based at q. If w is also a member of the inner patch, and (v,w) is an inner pair, then the pair contributes to the self-confidence of the inner patch, thereby strengthening the association between v and q.

Essentially, the k-patch best describing the cluster containing q would achieve as below:
i) a high proportion of inner pairs that contribute to the self-confidence of the inner patch, and
ii) a high proportion of neighbor pairs (not necessarily inner) that do not contribute to the self-confidence of the outer patch.

A high proportion of the former kind indicates a high level of association within the k-patch, whereas a high proportion of the latter kind indicates a high level of differentiation with respect to the local background. As both considerations are equally important, these proportions should be accounted for separately. The above considerations has been taken into account by maximizing, over all choices of k in the range a≤k≤b, the sum of these two proportions: that is, SCONF(Cq,k) and 1−SCONF(Cq,φ(k)).

The relative self-confidence maximization (RSCM) problem can thus be formulated as follows:

max $a \leq k \leq b$ RSCONF(Cq,k, φ), where

RSCONF(Cq,k, φ)=SCONF(Cq,k)−SCONF(Cq, φ(k))
=SCONF(NN(R, q, k))−SCONF(NN(R, q, φ(k))), wherein RSCONF is referred to as the relative self-confidence of the k-patch Cq,k with respect to R and φ. The k-patch at which the maximum is attained shall be referred to as the query cluster of q over this range. RSCM can be viewed as a form of maximum likelihood estimation (MLE), in which neighbor pairs are classified as either supporting or not supporting the choice of the inner patch as the query cluster.

FIG. 6 shows a sample pseudo-code listing for computing SCONF included in the method of the present invention as part of a patch profile of a query element, assuming that the neighbor lists NN(R, q, φ(b)) and NN(R, v, φ(b)) are already available for all v c NN(R, q, φ(b)). Instead of producing SCONF(NN(R, q, k)) via direct computation, it is obtained from SCONF(NN(R, q, k−1)) by computing the differential resulting from the expansion of the patch by one item.

In the present invention, the RSCM method as presented allows for many variations in the way the outer patch size depends on the value of k (k is integer.). Although the simple choice φ(k)=2k is ideal in that it provides the best balance between membership and non-membership of outer patch elements with respect to the inner patch, other considerations may influence the choice of φ(k). For example, the cost of computing boundary sharpness values may encourage the use of a maximum patch size m<2b. In this case, the outer patch size could be chosen to be φ(k)=min{2k, m}, provided that the smallest ratio m/b between outer and inner patch sizes is still substantially greater than 1.

In the present invention, the design of the RSCM method assumes that internal cluster association is equally important as external differentiation. However, in the present invention, different weightings can be given to the internal and external contributions to the relative self-confidence value; that is, one can instead maximize functions of the form RSCONF'(Cq,k,φ)=w1 SCONF(Cq,k)−w2 SCONF(Cq, φ(k)), for real-valued choices of weights 0<w1 and 0<w2.

In the present stage, each stored patch Cq,m=NN(R, q, m) is associated with a list of self-confidence values SCONF(Cq, k) for each sub-patch Cq,k=NN(R, q, k) of Cq,m, for all values of k in the range 1≤k≤m. The data constructions hereinafter referred to as the SCONF list, shown in FIG. 7, may be recorded in an adequate storage means such as a hard disk or a memory to be referred to by the cluster selection function of the present invention.

Further variation of the present invention is to save the cost of computation. The cost of computing RSCONF values grows quadratically as the maximum outer patch size increases. This cost restricts the size of clusters that can be discovered in practice using the RSCM method directly on the full data set. However, these restrictions can be circumvented through the use of random sampling techniques. Instead of accommodating large clusters by adjusting the limits of the range a≤k≤b over which the RSCM problem is solved, one can instead search for patches of sizes in a fixed range, taken relative to a collection of data samples of varying size.

To understand the above variation, the relationship between a uniform random sample R within S and a hypothetical query cluster NN(S, q, c), for some large value of c. The intersection of NN(S, q, c) and R produces a patch NN(R, q, k), where k=|NN(S, q, c)∩R|. The patch NN(R, q, k) serves as a proxy for NN(S, q, c) with respect to the sample R—the choice of NN(R, q, k) as a query cluster for q in R can be taken as an indication of the appropriateness of NN(S, q, c) as a query cluster for q with respect to the entire data set.

If a≤k≤b, then the proxy patch will be evaluated by the RSCM method. Otherwise, if k does not lie between a and b, the patch will not be evaluated. In terms of the unknown "true" cluster size c, bounds on the probability of the proxy patch not being evaluated can be derived using standard Chernoff bound techniques, as described (for example) in Motwani and Raghavan (R. Motwani and P. Raghavan, Randomized Algorithms, Cambridge University Press, New York, USA, 1995.):

$E[k]=\mu=c|R|/|S|$ $Pr[k<a|c] \leq e^{-\mu}[e\mu/(a-1)]^{a-1}$ $Pr[k>b|c] \leq e^{-\mu}[e\mu/(b+1)]^{b+1}$.

One can use these bounds as a guide in choosing appropriate values of a and b, as well as a collection of samples of appropriate sizes, so that for a desired probability for sufficiently-large c, at least one proxy patch has size between a and b for at least one of the samples.

As an illustrative example, consider a collection of uniform random samples {R0, R1, R2, . . . } such that |Ri|=|S|/2i for i≥0. Now, let NN(Ri, q, ki) be the proxy patch of NN(S, q, c), where c is an unknown value guaranteed to be at least 25. If the limits a=25 and b=120 are chosen, then for at least one sample Ri, the expected size μi=E[ki] of its proxy patch must lie in the range 44≤μi≤88. Applying the bounds stated above, when μi is restricted to this range, the probability of NN(Ri, q, ki) failing to be evaluated by the RSCM method is estimated to be low (less than 0.004285).

In other words, for this choice of range and samples, the probability that none of the proxy patches are evaluated is less than 1 in 233. This error bound is quite conservative—in practice, the probability of failure would be far smaller.

Even when the RSCM method promotes a proxy patch NN(Ri, q, ki) as a cluster estimator, there is no precise way of inferring the size of the corresponding cluster in S. However, following the principle of maximum likelihood estimation, the value c=E[k]|S|/|Ri| at which E[k]=ki constitutes a natural estimate of the true cluster size. The smallest cluster size that can be estimated with respect to sample Ri is therefore (a|S|)/|Ri|.

It should be noted that when the same cluster is detected several times over several different samples, the estimates of the true cluster size may not agree. Nevertheless in practice, a large RSCONF value will generally turn out to be a reliable indicator of the presence of a cluster, even if the size of the cluster cannot be precisely determined.

Element Reclassification

Further in the present invention, by virtue of the proximity of their members to a common query element, clusters produced by the RSCM method tend to be much more cohesive than those produced by agglomerative clustering methods, a desirable trait in the context of text mining. In particular, query clusters are biased towards shapes that are spherical relative to the pair wise distance metric.

Although the solution cluster patch for the RSCM problem as a whole exhibits a high level of mutual association relative to others based at the same query element, the members of such a cluster may or may not be strongly associated with the query element itself. Rather, the query element merely serves as a starting point from which a mutually well-associated neighborhood of the data can be discovered. When the query element is an outlier relative to its associated cluster, or in other situations in which a substantial portion of the reported cluster seems composed of outliers, it may be advantageous to reassess the outer patch elements according to a secondary clustering criterion. Such reassessment allows the discovery of cohesive clusters with less spherical bias.

Many methods may be possible for reclassifying the elements in the vicinity of a query cluster. A pseudo-code description of one such variation appears in FIG. 8. The process described in FIG. 8 is given below:

i) Given the inner k-patch that determined the original query cluster, all members of the corresponding outer patch are reassessed according to the actual number of k-nearest neighbors shared with the query element. In particular, every v included within NN(R, q, φ(k)) is ranked according to the confidence value CONF(Cq, Cv), where Cq=NN(R, q, k) and Cv=NN(R, v, k), from highest to lowest (ties are broken according to distance from q).

ii) The k elements having highest score can be reported as the new, adjusted cluster; alternatively, the entire ranking of the outer patch elements can be reported, and the user left to judge the final cluster membership. In this way, elements outside the original inner patch yet inside the outer patch are eligible for inclusion in the new cluster, provided they have a high number of original patch members among their nearest neighbors.

Selection of Clusters

The proposed total clustering strategy, the function Patch-Cluster constructs a query cluster relationship (QCR) graph drawn from a collection of uniform random samples {R0, R1, R2, ...} such that Ri within Rj for all j<i and |Ri|=ceil(|S|/2i)

for 0≦i<log2|S|. The graph structure depends on several parameters resembling the confidence and support thresholds used in association rule generation:

i) (cluster quality) a minimum threshold α on the relative self-confidence of clusters;
ii) (cluster differentiation) a maximum threshold β on the confidence between any two clusters of roughly the same size (drawn from a common sample Ri);
iii) (association quality) a minimum threshold γ on the confidence between associated clusters (not necessarily drawn from a common sample);
iv) (association scale) a maximum threshold δ on the difference in scale between two associated clusters (that is, the difference |i−j|, where Ri and Rj are the samples from which the clusters derive).

FIG. 9 shows a sample pseudo-code description of the Patchcluster method used in the present invention. The basic QCR construction strategy can be summarized as follows:

1. QCR Node Set:

For each 0≦t<log2|S|, from the elements of sample Rt, generate a collection of query clusters QCt={C1, C2, ..., C|Rt|}, with each cluster Ci=NN(Rt, qi, ki) based at a different query element of Rt, and a≦|Ci|≦b. Choose the membership of QCt in greedy fashion from among the available query clusters according to RSCONF values, where i<j=>RSCONF (Ci)≧RSCONF(Cj), subject to two conditions:

i. (cluster differentiation) max {CONF(Ci,Cj),CONF(Cj, Ci)}<β for all 1≦i<j≦mt.;
ii. (cluster quality) RSCONF(Ci)≧α for all 1≦i≦|Rt|.

These clusters become the nodes of the QCR graph at level t.

2. QCR Edge Set:

For each pair of distinct query clusters Ci=NN(Ri, qi, ki) in QCi and Cj=NN(Rj, qj, kj) in QCj such that i≦j≦i+δ, insert directed edges (Ci,Cj) and (Cj,Ci) into the QCR graph if max {CONF(Ci,C'j),CONF(C'j,Ci)}≧γ, where C'j=NN(Ri,qj,2j−ikj). Apply the values CONF(Ci,C'j) and CONF(C'j,Ci) as weights of edges (Ci,Cj) and (Cj,Ci), respectively.

Each level of the graph can be viewed as a rough slice of the set of clusters, consisting of those with estimated sizes falling within a band depending upon the level, and upon a and b. Within each slice, candidates are chosen greedily according to their RSCONF values, with new candidates accepted only if they are sufficiently distinct from previously-accepted candidates.

Figure 10:
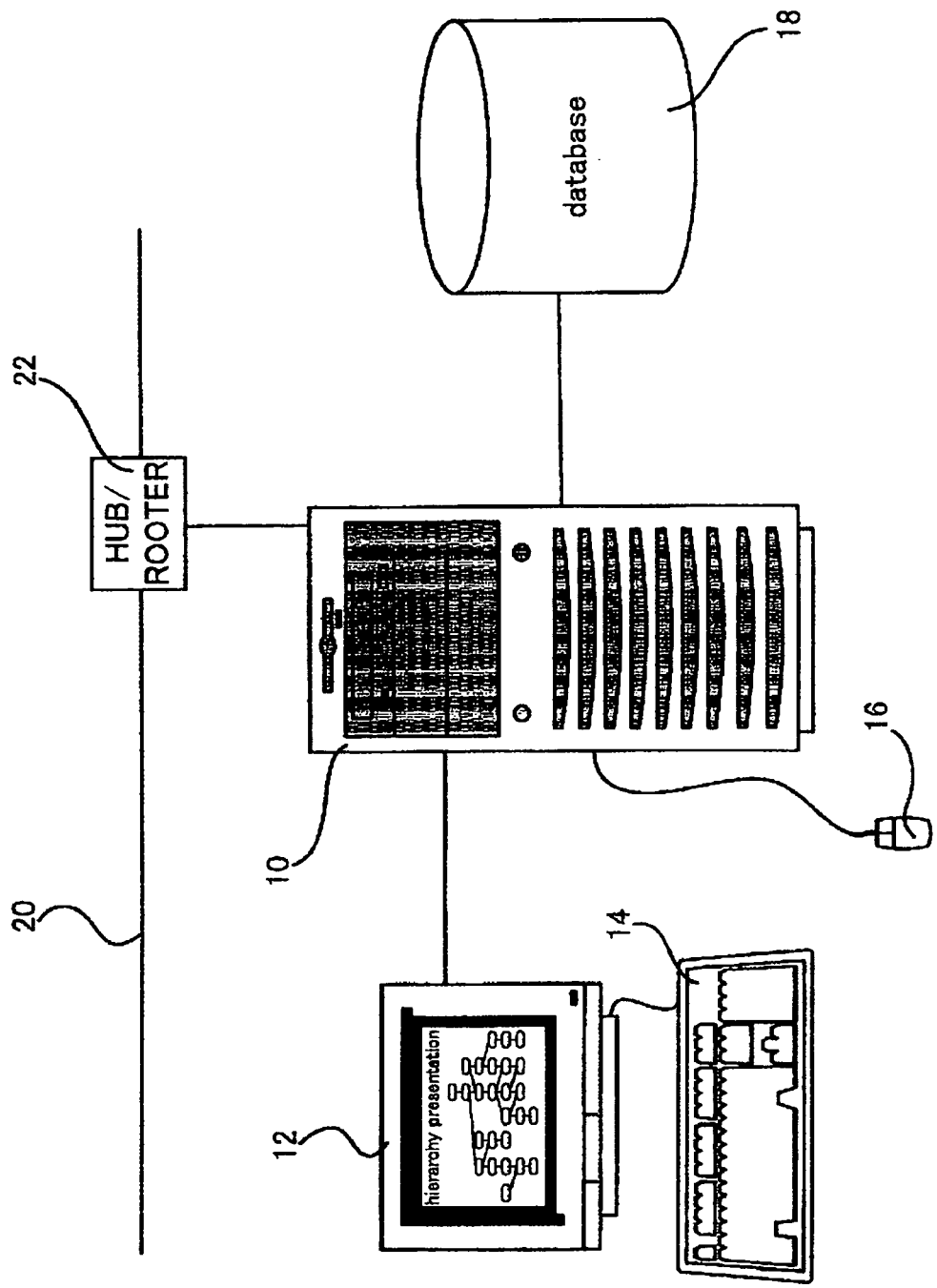
FIG. 10 is a schematic block diagram of a computer system typically used in the present invention.

In the present invention, although duplicate clusters occurring at a common level are eliminated, duplicate clusters are tolerated when they occur at different levels. The QCR graph can thus contain any given cluster only a small number of times. The presence of the same cluster at several consecutive levels actually improves the connectivity of the structure, as two query clusters sharing a common concept are likely to be deemed to overlap, and thereby be connected by an edge. FIG. 10 shows a sample pseudo-code listing for eliminating clusters, referred to as the "Patchcluster method" in the present invention.

By lowering or raising the value of α, users can increase or decrease the number of cluster nodes appearing in the graph. Raising the value of β also increases the number of clusters; however, this comes at the risk of individual concepts being shared by more than one cluster from a given sample. Users can vary the value of γ to influence the number of graph edges. For the purpose of navigating the clustering results, high graph connectivity is desirable. The maximum threshold δ on the difference in scale between two associated clusters of the QCR graph should be a small, fixed value, for reasons that will be discussed later.

Another variation of the PatchCluster method involves the control of the number of clusters. As described above, the number of clusters produced is controlled by specifying a threshold α on the relative self-confidence of the query clusters reported. Instead, the user may be given the option of determining the number of clusters for each data sample separately. For a given level t, this can be done by:
i) specifying a minimum threshold αt on the relative self-confidence of the query clusters to be reported from level t, or
ii) specifying a maximum threshold on the absolute number of query clusters to be reported from level t.

When a threshold on the number of clusters is given, the greedy selection of clusters terminates when the desired numbers of clusters have been obtained, or when all candidates have been considered (whichever occurs first).

In the Patchcluster method, PatchCluster/RSCM parameters may be determined depending on the system to which the above described method or algorithm is implemented. The parameters determined are as follows:

Inner Patch Size Range

The inner patch size range [a, b] should be chosen so as to allow arbitrarily-large clusters to be discovered by the method. Although more precise choices of a and b are possible by analyzing the probability of failure (using Chernoff bounds as described earlier), the following general principles apply; parameter a should be large enough to overcome the variation due to small sample sizes. It is recommended that the variable a be no smaller than 20. Parameter b should be chosen such that the ranges of cluster sizes targeted at consecutive levels has substantial overlap. This is achieved when b is roughly 3 times as large as a, or greater.

Maximum Patch Size

Also the maximum patch size should be chosen to be as small as possible for reasons of efficiency. However, it should be chosen to be substantially larger than b. The choice φ(b)=2b is ideal; however, the choice φ(b)=1.25b can also give good results. In the best embodiment of the present invention, a=25, b=120, and φ(k)=min {2k, 150} were preferred because satisfactory results were obtained with many data sets.

The maximum threshold β on the confidence between any two clusters from a common sample should be set to roughly 0.4, regardless of the data set Experimentation showed that overlapping query clusters from a common sample tend either to overlap nearly completely, or only slightly. The clustering produced by the PatchCluster method is relatively insensitive to the exact choice of b.

The Threshold δ

The maximum threshold δ on the difference in scale between two associated clusters of the QCR graph should always be a small, fixed value, for several reasons. Large values will lead to graphs in which the largest clusters would be connected to an overwhelming number of very small clusters. As a result, the QCR graph would become very difficult for users to navigate. For every query cluster from level 0, a neighborhood of the form NN(Ri,qj,2δkj) would need to be computed. To ensure scalability, δ must be chosen to be a small constant. The value used in the experimentation, δ=4, allowed association edges to be generated between clusters whose sizes differ by at most a factor of roughly 24 to 25. This choice of δ is strongly recommended.

The following parameters should be set by users according to their particular demands:
(a) The minimum threshold a on the relative self-confidence of clusters (or alternatively, for each sample level, the minimum cluster relative self-confidence and/or the maximum number of desired query clusters). Values in the range 0.1☐α☐0.2 are recommended; the smaller the value, the greater the number of clusters.
(b) The minimum threshold γ on the confidence between associated clusters in the QCR graph (not necessarily drawn from a common sample level). Values in the range 0.15☐γ☐0.2 are recommended; the smaller the value, the greater the number of edges of the graph.
(c) The number of keyword labels to be applied to each query cluster.

A further variation of the PatchCluster method is to compute approximate neighborhood patches instead of exact ones. The neighborhood computation performed by the PatchCluster method can be expensive if the number of data elements is large and exact neighborhood information is sought. To improve the efficiency of the method, approximate neighborhood information can be substituted. Similarity search structures such as a SASH can be used to generate this information much faster than sequential search at high levels of accuracy.

A further variation of the PatchCluster method variation is to perform dimensional reduction of the document-keyword vectors and keyword vectors.

The basic PatchCluster method, as described in FIG. 9, when applied to text data, assumes that documents have been modeled as vectors using an appropriate weighting. When the keyword space is large, but the average number of keywords per document is small, distance computations between vectors can be performed efficiently if the vectors are represented implicitly (that is, if only non-zero entries and their positions are stored). However, when the average number of keywords per document is large, dimensional reduction is often performed in order to limit the cost of distance comparisons. Regardless of the original average number of keywords per document, dimensional reduction techniques such as LSI or COV can be applied to the data before clustering, if desired. The experimental results presented in the Embodiments section show the respective advantages of the use or non-use of dimensional reduction.

Yet another variation of PatchCluster method variation is possible by incorporating QCR graph simplification. The QCR graph produced by the PatchCluster method contains association information for many pairs of clusters. However, this information may sometimes be too dense for users to easily navigate without simplification. Some of the ways in which the graph could reasonably be simplified are:
i) (Elimination of transitive edges between levels.) For example, assume the graph contains cluster nodes C1=NN(Ru, q1, k1), C2=NN(Rv, q2, k2), and C3=NN(Rw, q 3, k3), where u<v<w, and association edges (C1,C2), (C2,C3) and (C1,C3). Then edge (C1,C3) can be hidden from the user, since he or she would still be able to navigate from C1 to C2 via (C1,C2) and (C2,C3).
ii) (Contraction of similar clusters.) If two clusters C1=NN(Ru, q1, k1) and C2=NN(Rv, q2, k2) are deemed to be very similar due to sufficiently high values of both CONF(C1, C2) and CONF (C2,C1), then their respective nodes can be contracted. One of the two nodes is retained and the other is eliminated (the retained cluster node can be chosen in a variety of ways, such as the one with higher RSCONF value, or the one with larger size). Any edges involving the eliminated node are then assigned to the retained node; for example, if C1 is retained and C2 is eliminated, then the edge (C2, C3) is converted to (C1,C3). Any duplicate edges that result would also be eliminated. Of course, other simplification methods may be adopted in the present invention.

<Graphical User Interface: Cluster Labeling>

In order to provide a useful graphical user interface for displaying searched clusters, the problem of query cluster labeling and identification will now be considered in the context of textual data and vector space modeling. Since query clusters lie within a restricted neighborhood of a single query element, it is tempting to use the query as a descriptor of the cluster, much as in representative-based clustering. However, the query element may not necessarily be the best representative for its cluster; indeed, it may be the case that no individual element of the cluster adequately describes the whole.

One common way of assigning labels to a cluster is to use a ranked list of terms that occur most frequently within the documents of the cluster, in accordance with the term weighting strategy used in the document vector model. Each term can be given a score equal to the sum (or equivalently the average) of the corresponding term weights over all document vectors of the clusters; a predetermined number of terms achieving the highest scores can be ranked and presented to the user.

If dimensional reduction techniques such as COV or LSI are being used, the original unreduced document vectors may no longer be available, or may be expensive to store and retrieve. Nevertheless, meaningful term lists can still be extracted even without the original vectors. Note first that the i-th term can be associated with a unit vector $z_i=(z_{i,1}, z_{i,2}, \ldots, z_{i,d})$ in the original document space, such that $z_{i,j}=1$, if $i=j$, and $z_{i,j}=0$ otherwise. Now, let $\mu$ be the average of the document vectors belonging to the query cluster $NN(R, q, k)$. Using this notation, the score for the i-th term can be expressed simply as $z_i \Box \mu$. However, since $\|z_i\|=1$ and $\mu$ is a constant, ranking the terms according to these scores is equivalent to ranking them according to the measure as below:

$$z_i \times \mu / \|\mu\| = \text{cosangle}(z_i, \mu) = \cos \theta_i,$$

where $\theta_i$ represents the angle between vectors $z_i$ and $\mu$.

With dimensional reduction, the pair wise distance cosangle(v, w) between vectors v and w of the original space is approximated by cosangle(v', w'), where v' and w' are the respective equivalents of v and w in the reduced dimensional space. Hence we could approximate cosangle($z_i$,$\mu$) by cosangle(z'i, $\mu'$), where z'i and $\mu'$ are the reduced-dimensional counterparts of vectors $z_i$ and $\mu$, respectively. The value cosangle(z'i, $\mu'$) can in turn be approximated by cosangle(z'i, $\mu''$), where $\mu''$ is the average of the reduced-dimensional vectors of the query cluster. Provided that the vectors z'i have been precomputed for all $1 \leq i \leq d$, a ranked set of terms can be efficiently generated by means of a nearest-neighbor search based on $\mu''$ over the collection of reduced-dimensional attribute vectors. As d is typically quite small, the cost of such a search is negligible compared to the cost of generating the cluster itself.

The reduced-dimensional cluster labeling method can be summarized as follows:

i) For all $1 \leq i \leq N$, precompute the reduced-dimensional attribute vector $z_i=(z_{i,1}, z_{i,2}, \ldots, z_{i,d})$ for the i-th attribute. Let W be the set of reduced-dimensional attribute vectors.

ii) Compute $\mu''=Sv$ included within $NN(R, q, k)$ v, where v and q are taken to be reduced-dimensional data vectors.

iii) If $\lambda$ is the desired number of labels for the cluster, compute the $\lambda$-nearest-neighbors of $\mu''$ in W, according to decreasing values of the cosangle measure.

iv) Report the attributes corresponding to the ranked list of $\lambda$ neighbors as the cluster labels.

Optionally, the values of cosangle themselves can be displayed to the user. Also optionally, approximate nearest neighbors can be used as produced using a SASH or other similarity search method.

Part II—A System for Information Retrieval

FIG. 10 shows a system to which the algorithm of the present invention is implemented. As shown in FIG. 10, the system generally comprises a computer 10, a display device 12, and a input device such as a keyboard 14 and a pointer device such as an mouse 16 such that a user may input a query for information retrieval according to the present invention. The computer 10 also manages a database 18 for storing documents to be searched. The computer may add new documents to the database 18 and retrieve stored documents therefrom. The computer 10 may be connected to communication lines 20 such as LAN or WAN or Internet such as Ethernet (Trade Mark), an optical communication, or ADSL with suitable communication protocols through a hub or router 22.

When the communication line 20 is assumed to be LAN/WAN and/or Internet locally interconnecting sites of an enterprise, the computer 10 may be a server to which inputted queries from clients and/or users are transmitted to execute information retrieval. The server computer 10 retrieves documents with respect to the received query by the algorithm of the present invention and returns the retrieved results to the clients that issued the query. Of course, the present invention may provide the above information retrieval through the Internet as charged information services to registered clients. Alternatively, the computer 10 may be a stand-alone system suitably tuned for a particular usage.

Figure 11:
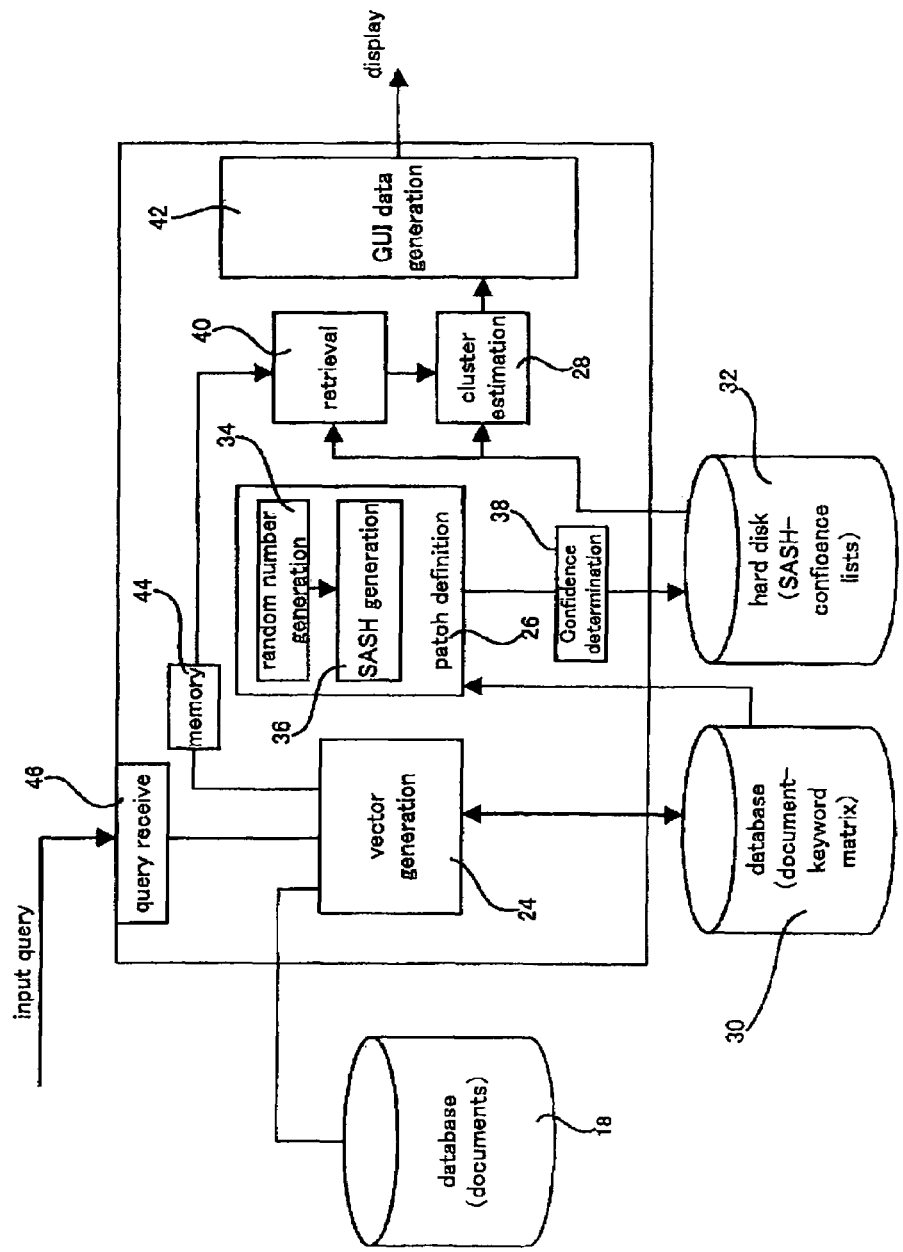
FIG. 11 is a schematic function block diagram of the computer system according to the present invention.

FIG. 11 shows detailed functional blocks implemented in the computer 10. The computer 10 generally comprises a vector generation subsystem 24, a SASH generation subsystem 36, a confidence determination subsystem 38 for creating the SCONF list, and a patch definition subsystem 26. The vector generation subsystem 24 executes vector generation using a keyword list or predetermined rules from the documents stored in a database 18, and stores generated document-keyword vectors in an appropriate storage area such as a memory or a database with adequate links or references to the corresponding documents. The SASH generation subsystem 36 and the patch definition subsystem 26 constitute the neighborhood patch generation subsystem 34 according to the present invention.

The SASH generation subsystem 36 constructs the SASH structure using the algorithm shown in FIG. 2 and the generated SASH structure is stored in the memory area 30 for the processing described hereinafter in detail. The SASH is made available to a confidence determination subsystem 38 to compute confidence values such as CONF, SCONF, and RSCONF so as to generate a SCONF list according to the above described algorithm. The generated patch data and the confidence values are stored in a hard disk 32, as shown in FIG. 7.

The query vector generation subsystem 46 accepts search conditions and query keywords and creates a corresponding query vector, and stores the generated query vector in an adequate memory area. The query may be of two types; one is to extract cluster structures already computed and stored in the database 32, and the other is to retrieve cluster structures that may not yet have been computed and stored. The user input query vector is first transmitted to a retrieval subsystem 40. In the described embodiment, the retrieval subsystem analyses the query type. If the query instructs the retrieval subsystem 40 to retrieve cluster structures already computed and stored, the query is performed on the SASH structure stored in the memory area 30, and the queried patch generation subsystem 44 transmits the retrieved data to the cluster estimation subsystem 28. The cluster estimation subsystem 28 invokes the patch data and associated SCONF list from the hard disk 32 upon receiving the retrieved data, and performs cluster estimation using intra-cluster confidences SCONF and RSCONF, and inter-cluster confidences CONF, respectively. The nodes used in the queried patch generation subsystem 44 may be an arbitrarily selected node or a node retrieved by the user input query.

The derived cluster data are transmitted to a GUI data generation subsystem 42 to construct data for graphically presenting the cluster graph structure on a display screen of a display subsystem (not shown). Many display embodiments of the cluster graph structure are possible in the present invention. One representative embodiment is to align the clusters horizontally along with significant keywords (for example, the largest numeral values) included in the clusters while aligning the clusters vertically with estimated cluster size. When such display is provided on the display screen, the GUI data generation subsystem 42 may sort the cluster data from the patch repository 32, and store the sorted data in an adequate memory area therein such as a display buffer (not shown), or elsewhere in the computer 10.

In an specific embodiment of the present invention, when the retrieval subsystem 40 determines that the query instructs the retrieval of clusters that have not already been computed and stored, the retrieval subsystem 40 invokes the SASH data 30, and retrieves the appropriate node vectors of the SASH by computing similarities between the document-keyword vectors and the query vectors. The retrieved data vectors are then themselves used as queries within the SASH data 30, to obtain a list of similar node vectors for every vector retrieved by the original query. Each list of node vectors is sent to the patch definition subsystem 26 and thence to the confidence determination subsystem 38 to produce patches, which may then be added to the patch repository 32. The retrieved patches are then transmitted to the cluster estimation subsystem 28 together with their corresponding SCONF lists to estimate the cluster comprising nodes retrieved in the original query, and the computed cluster data are transmitted to the GUI data generation subsystem 42 for graphical presentation of the queried results.

The GUI data generation subsystem 42 may transmits sorted cluster data to a display device (not shown) directly connected to the computer 10 to display the searched cluster data on a display screen. Alternatively, when the system provides the searched results via the Internet using a browser software, the GUI data generation subsystem 42 generates graphical data of the interrelation of the clusters in a format suitable to the browser software, such as an HTML format.

Part III. Practical Scenarios for Executing Invention

Scenario A—Total Clustering of Nodes in Database

Figure 12:
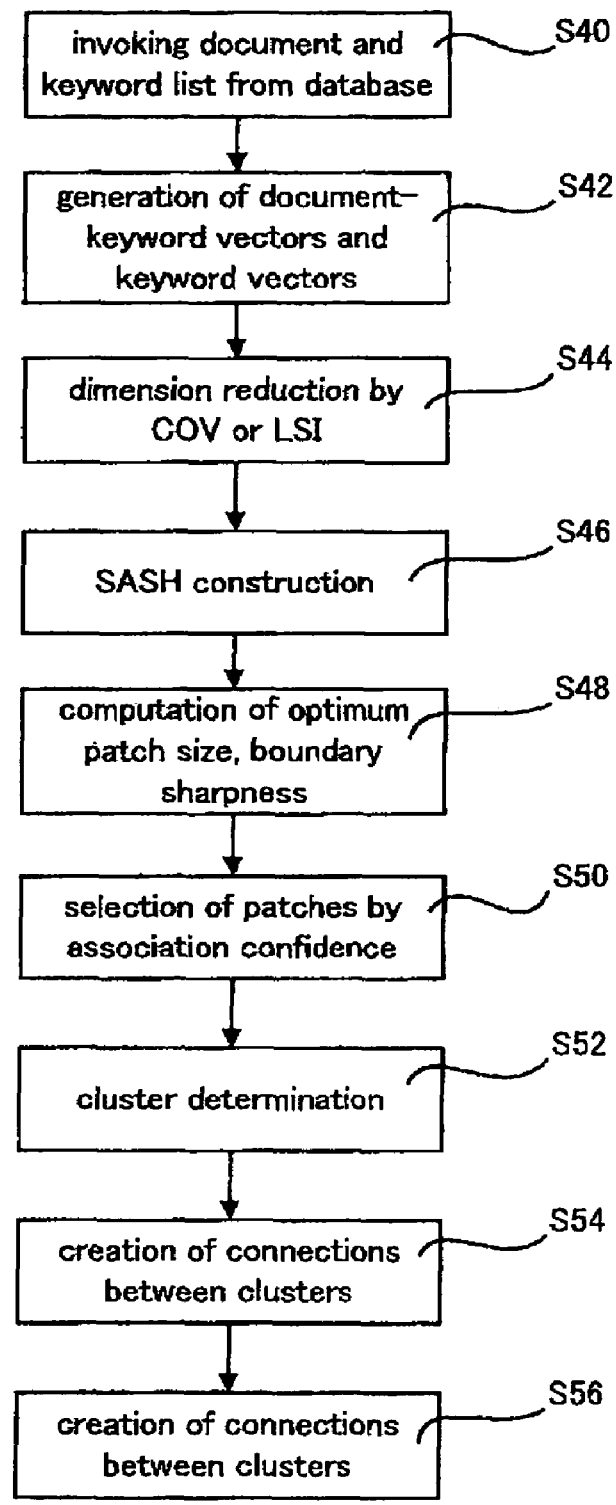
FIG. 12 is a flowchart of the process for generating the clusters and their interrelationship graph (Scenario A).
Figure 13:
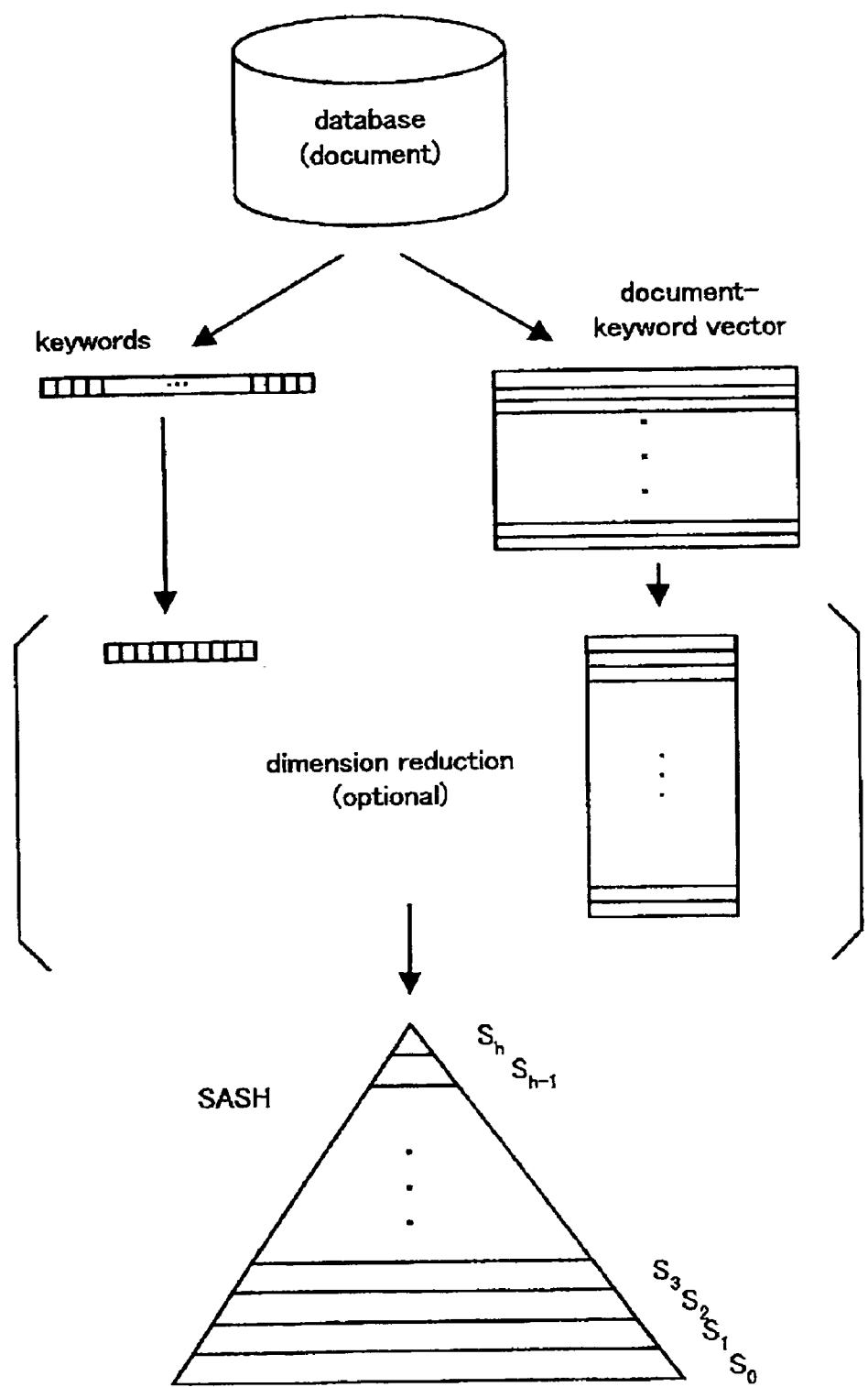
FIG. 13 is a graphical representation of the data structures relevant to the process of Scenario A shown in FIG. 12.

FIG. 12 shows a flowchart for Scenario A for executing total clustering of the nodes stored in the database. The algorithm of Scenario A first loads the document and the keyword data in the step S40 and proceeds to the step S42 to generate document-keyword vectors and keyword lists. The algorithm executes in the step S46 dimension reduction using LSI or COV as described before. Then the process of Scenario A creates in the step S46 a SASH of the dimension reduced document-keyword vectors according to the process described in FIG. 2. The data structures generated according to the algorithm shown in FIG. 12 are shown in FIG. 13 according to the stepwise execution of the algorithm.

Once the SASH structure has been constructed, a similarity query is performed based on each of its elements, thereby generating one patch for each document, as shown in FIG. 14($a$). The algorithm of Scenario A then computes in the step S48 the optimum patch sizes and RSCONF values for each patch as shown in FIG. 14($b$), and then the patches are sorted with respect to their RSCONF values as shown in FIG. 14($c$).

Figure 15:
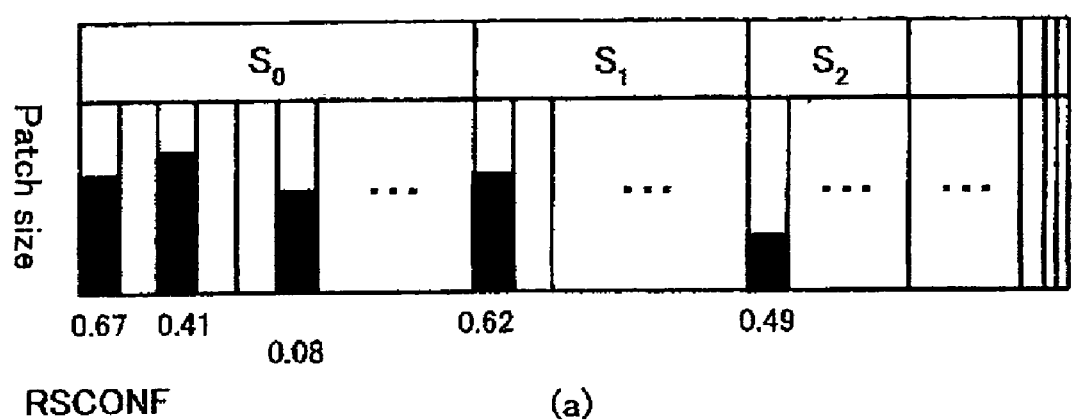
FIG. 15 is a graphical representation of the data structures relevant to the process of Scenario A shown in FIG. 12.

Again referring to FIG. 12, the algorithm of Scenario A proceeds to the step S50 to select, at each SASH level, a collection of patches for which all inter-patch association confidences at that level are less than $\beta=0.4$. Then those patches with RSCONF values larger than or equal to $\alpha=0.15$ are further selected to determine the clusters, in the step S52. The data structures relevant to the steps S46-S52 are shown in FIG. 15.

Figure 16:
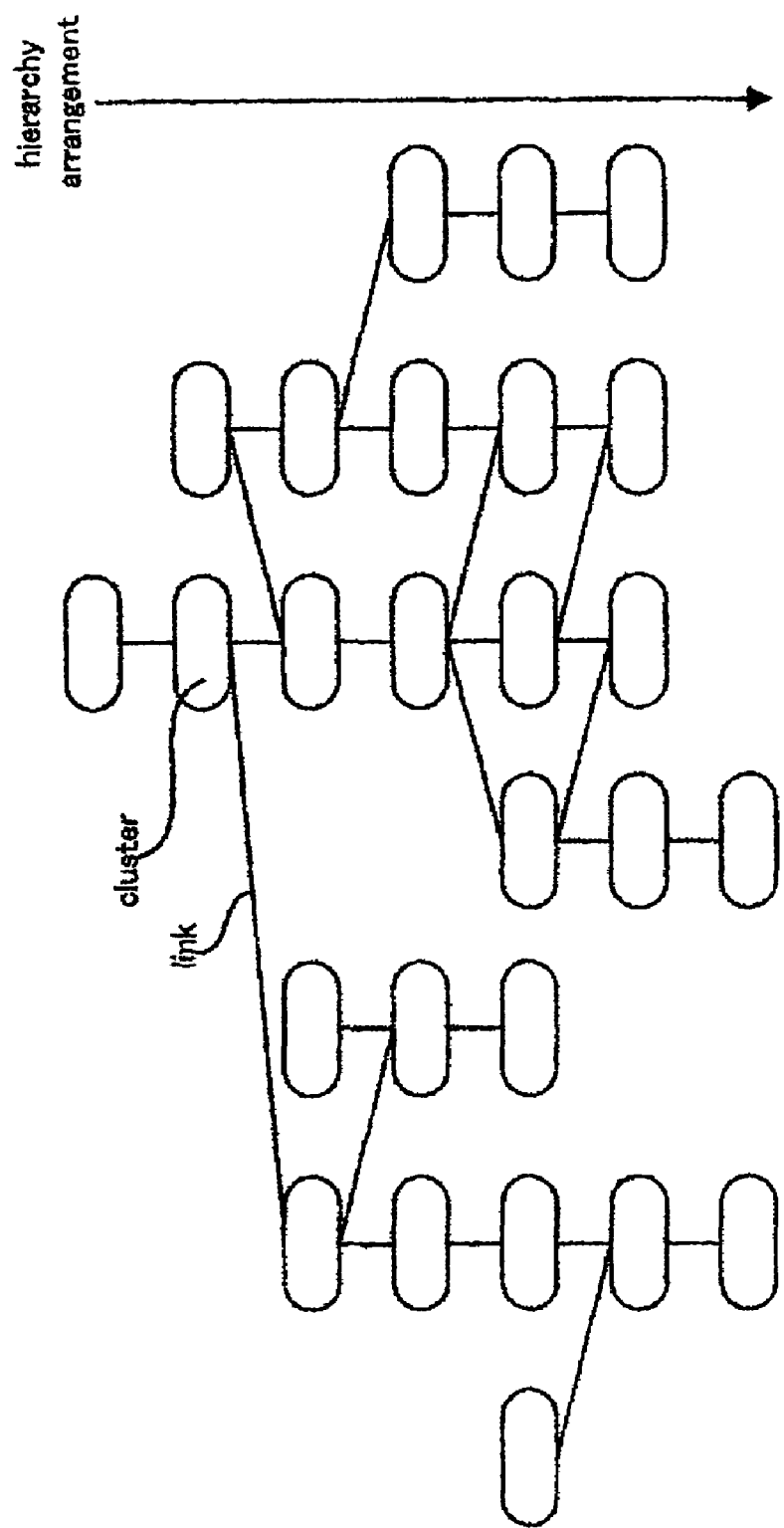
FIG. 16 is a graphical representation of the cluster interrelationship graph.

Next, the algorithm of Scenario A proceeds to the step S54 to create connections between the clusters having the association confidence values larger than or equal to the predetermined threshold $\gamma$. This data structure is shown in FIG. 16. These results of connection together with the cluster labels and corresponding keywords are provided graphically in the step S56 as a graphical representation such as that shown in FIG. 17.

Figure 17:
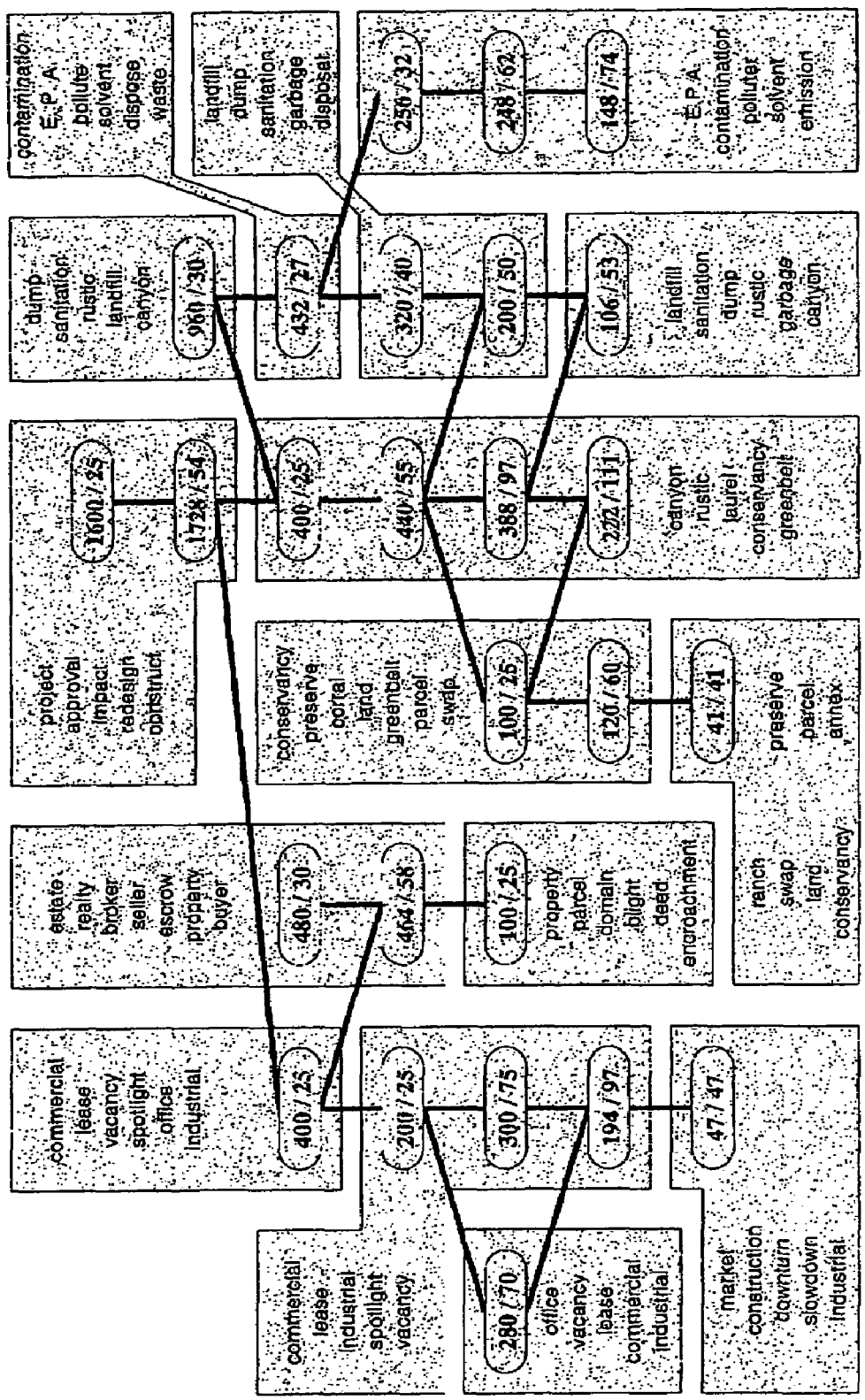
FIG. 17 is a sample graphical presentation of the interrelationship structure of clusters.

In FIG. 17, a portion of a cluster graph produced according to Scenario A (on an earlier run with $\gamma=0.2$) is shown in FIG. 17 for the case in which COV dimensional reduction was used. In the figure, cluster nodes (shown as ovals) are marked with a pair of numbers x/y, where x indicates the estimated size of the cluster and y indicates the associated sample patch size. Keyword labels are shown for each cluster—boxes have been drawn around those connected subsets of clusters sharing identical label sets (with perhaps minor differences in the label ordering). The cluster corresponding to the node marked 106/53 is shown in FIG. 17. This cluster is particularly interesting, as it consists of news articles in the intersection of two larger sets of clusters, involving canyons and their development and conservation issues on the one hand, and garbage dumps and landfills on the other.

The detailed procedure included in the processes shown in FIG. 12 are described as below:

i) Model the subset of M documents as vectors, using (for example) the binary model or TF-IDF weighting. The dimension of these vectors is N, the number of attributes of the data set.

ii) As a further example, apply dimensional reduction of the set of vectors to a number significantly smaller than N (typically 200 to 300), using (for example) the COV or LSI reduced-dimensional technique. If dimensional reduction is chosen, then also generate a set of reduced-dimensional attribute vectors.

iii) Construct the SASH structure for handling k-nearest-neighbor queries. Set the random sample $Rt=St \leq St+1 \leq \ldots U\, Sh$, where St is the t-th SASH level for $0 \leq t \leq h$ (here, S0 is taken to be the bottom SASH level).

iv) For all $0 \leq t \leq h$, for each element v within St, compute and store an approximate m-nearest-neighbor list (m-patch) $NN(Rt, v, m)$ for that element, where $m=\phi(b)$.

v) Compute a set of query clusters and a cluster structure graph as outlined in FIG. 16.

vi) When the dimension reduction is performed, for each query cluster of the set, generate a set of attribute keywords from the reduced-dimensional document vectors that constitute the cluster.

vii) Make the resulting set of clusters, their sizes and labels, and cluster structure graph available to the user for browsing, using a suitable user interface.

Scenario B—Individual Clusters; Query Search

Figure 18:
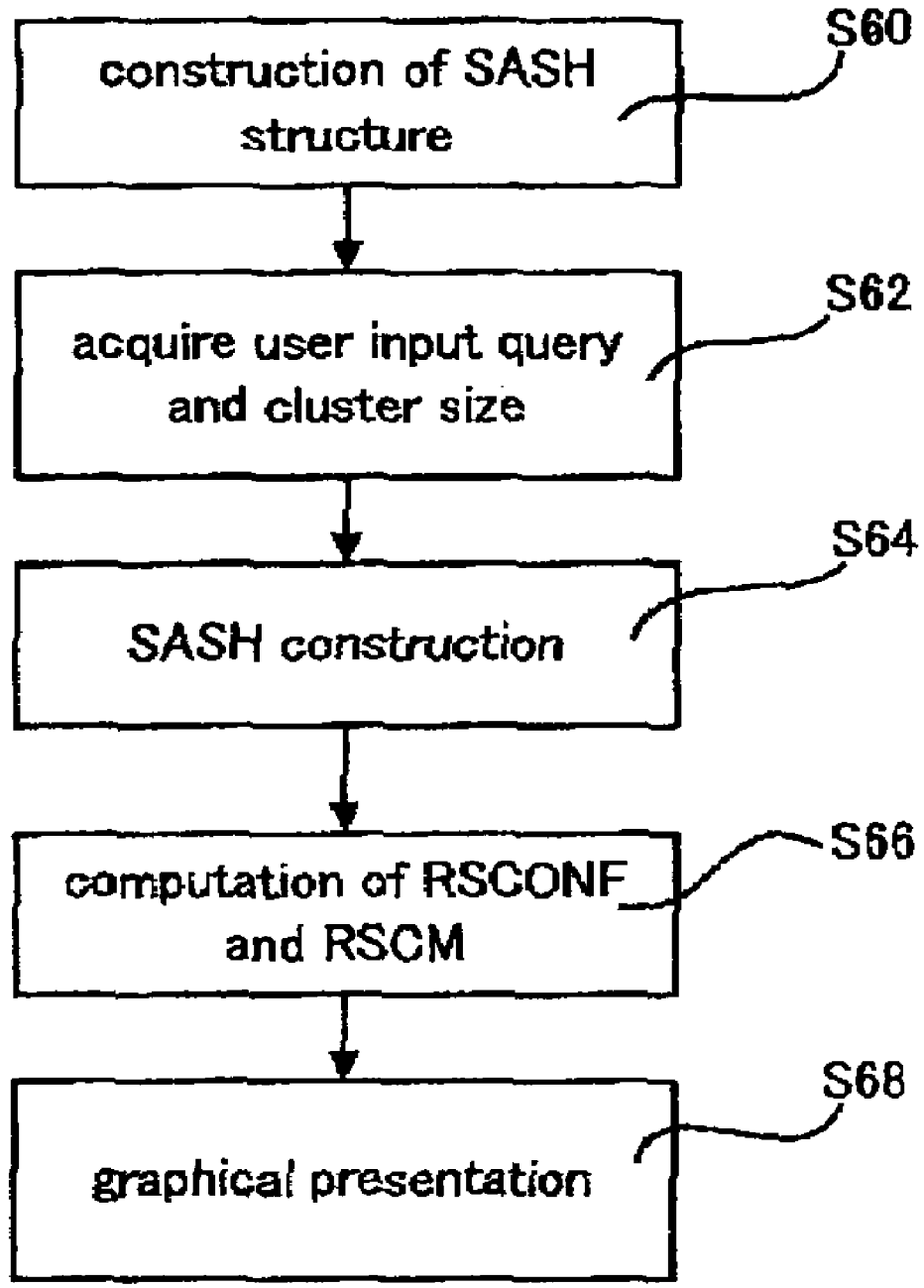
FIG. 18 is a flowchart of the process for generating clusters based at a single query element (Scenario B).

In Scenario B, the same process as in Scenario A may be used to generate a SASH. The subsequent essential steps are shown in FIG. 18, and the data structures generated by the process of Scenario B are shown in FIG. 19 and FIG. 20. As shown in FIG. 18, the process of Scenario B generates the SASH structure in the step S60, and proceeds to the step S62 to receive a user input query q together with a target cluster size k, and stores them in an adequate memory space. Then the nodes in SASH are retrieved with respect to the query using the SASH structure in the step S64. In the step S64, the SASH is queries to produce one neighborhood patch for the query element q with respect to each of the random samples Rt, for all $0 \leq t \leq h$. Then the process continues to the step S66 to compute RSCONF and to solve the RSCM problem with respect to the user input query q, for every random sample. For each sample, a cluster is thereby produced. The process of Scenario B then provides labels, keywords representing these clusters, in the step S68. The data structures obtained from the step S64 to the step S68 are shown in FIG. 20.

The details of the procedures in Scenario B are described below:

2-i) Repeat the procedures of Scenario A from i to iii.
2-ii) Prompt the user for a query element q (not necessarily a data element), and a target cluster size k.
2-iii) Compute ta=max $\{t|k/2t \leq a\}$ and tb=min $\{t|k/2t \leq b\}$. For all $tb \leq t \leq ta$, compute NN(Rt, q, m), where m=$\phi$(b). For all v within NN(Rt, q, m), compute NN(Rt, v, m).
2-iv) For all $tb \leq t \leq ta$, find solutions k(q,t) to the RSCM problems for q with respect to Rt.
2-v) For all $tb \leq t \leq ta$, generate a set of attribute keywords from the reduced-dimensional document vectors that constitute the query cluster NN(Rt, q, k(q,t)). The procedure has been described in FIG. 14.
2-vi) Display the resulting set of clusters, their sizes, their corresponding m-patch SCONF profiles, and their cluster labels to the user.

EXAMPLES

To examine the present invention, the method of the present invention was implemented as two scenarios as described above. Both scenarios were examined for the publicly-available L.A. Times news document database available as part of the TREC-9 text retrieval competition. The database consists of M=127,742 documents, from which N=6590 keywords (attributes) were extracted as the attribute set. To examine effectiveness and general applicability, the database was subjected to two procedures with and without the dimension reduction (under COV). The implementation conditions were as follows:

(a) TF-IDF term weighting on 6590 attributes.
(b) COV dimensional reduction (from 6590 down to 200 dimensions) in one set of experiments, and no dimensional reduction in another.
(c) For document nearest-neighbor searches, a SASH with default settings (node parent capacity p=4 and node child capacity c=16).
(d) For attribute vector nearest-neighbor searches, a SASH for reduced-dimensional attribute vectors with default values (node parent capacity p=4 and node child capacity c=16).

For each scenario, it was assumed that parameters $\phi$, a, b, $\beta$, and $\delta$ were set by the system administrator, as well as any parameters associated with dimensional reduction (such as the reduced dimension d) or approximate similarity search.

The experimental conditions are as follows:

(a) The choice of patch range delimiters a=25, b=120, and $\phi(k)$=min $\{2k, 150\}$.
(b) For document nearest-neighbor searches, the use of a time scaling factor $\mu'$=1.25 $\mu$=1.25 $\phi$(b)

influencing the accuracy of the approximation. With every search, $\mu'$ neighbors are produced, of which the closest m are used (larger values of $\mu'$ require longer search times but lead to more accurate results).

(c) A minimum threshold of $\alpha$=0.15 on the relative self-confidence of clusters.
(d) A maximum threshold of $\beta$=0.4 on the confidence between any two clusters from a common sample.
(e) A minimum threshold of $\gamma$=0.15 on the confidence between associated clusters in the QCR graph (not necessarily drawn from a common sample level).
(f) A maximum threshold of $\delta$=4 on the difference in scale between two associated clusters of the QCR graph.

The computation algorithm was written using Java (JDK1.3) and the computation hardware was an IBM Intellistation E Pro (Trade Mark) with 1 GHz processor speed and 512 Mb main memory running the Windows 2000 (Trade Mark) operating system.

2-1. Execution Time and Storage Costs

Although at first glance it would seem that RSCONF values are expensive to compute, with a careful implementation the costs can be kept reasonably low. This is achieved through the efficient computation of a profile of values of SCONF(NN (R, q, k)) for k ranging from 1 to $\phi$(b). Plots of patch profiles also provide an effective visual indication of the varying degrees of association within the neighborhood of a query element.

The following tables list the time and space costs associated with Scenario A. Time was measured in terms of real seconds of computation, beginning once reduced-dimensional document and attribute vectors had been loaded into main memory, and ending with the computation of a full set of clusters and their cluster structure graph. The time cost for clustering and graph construction assumes that all nearest-neighbor patches have already been precomputed.

TABLE 1

| STORAGE COSTS (Mb) - Reduced Dimensional Case | |
|---|---|
| Document SASH Storage | 30.1 |
| Keyword SASH Storage | 1.6 |
| NN Patch Storage | 161.6 |
| Reduced-Dimensional Document Storage | 204.4 |
| Reduced-Dimensional Keyword Storage | 5.3 |
| Total Storage | 403 |

TABLE 2

| TIME COSTS | No Dim-Reduction | COV Dim-Reduction |
|---|---|---|
| Document SASH Build Time (s) | 460.7 | 898.8 |
| Keyword SASH Build Time (s) | — | 26.6 |
| Total NN Precompution Time (s) | 7,742.9 | 13,854.6 |

TABLE 2-continued

| TIME COSTS | No Dim-Reduction | COV Dim-Reduction |
|---|---|---|
| Clustering and Graph Construction Time (s) | 126.2 | 81.8 |
| Total Time (s) | 8,329.8 | 14,861.8 |
| Total Time (hr) | 2.3 | 4.1 |

2-2. Approximate Nearest Neighbor Computation

The following table shows the average cost of finding approximate m-nearest-neighbor lists from a full set of M documents, taken over 100 randomly-chosen SASH queries of size m'. For comparison purposes, exact queries were also performed using sequential search, and the average accuracy of the SASH queries was computed (measured as the proportion of true nearest neighbors in the reported lists). Using these values, one can determine the cost of producing a single query cluster directly as per Scenario B. These latter estimates assume the use of the document SASH without pre-computed nearest-neighbor information.

TABLE 3

| SASH Performance | No Dim-Reduction | COV Dim-Reduction |
|---|---|---|
| Avg SASH Query Dist Computations | 3,039.03 | 2,714.57 |
| Average SASH Query Time (ms) | 38.85 | 70.74 |
| Average SASH Query Accuracy (%) | 62.93 | 94.27 |
| Exact NN Query Dist Computations | 127,742 | |
| Exact NN Query Time (ms) | 1,139.19 | 2,732.5 |
| Single Query Cluster Dist Comps ($\times 10^5$) | 4.59 | 4.07 |
| Single Query Cluster Time (s) | 5.87 | 10.68 |

2-3. Full Query Clustering

Figure 21:
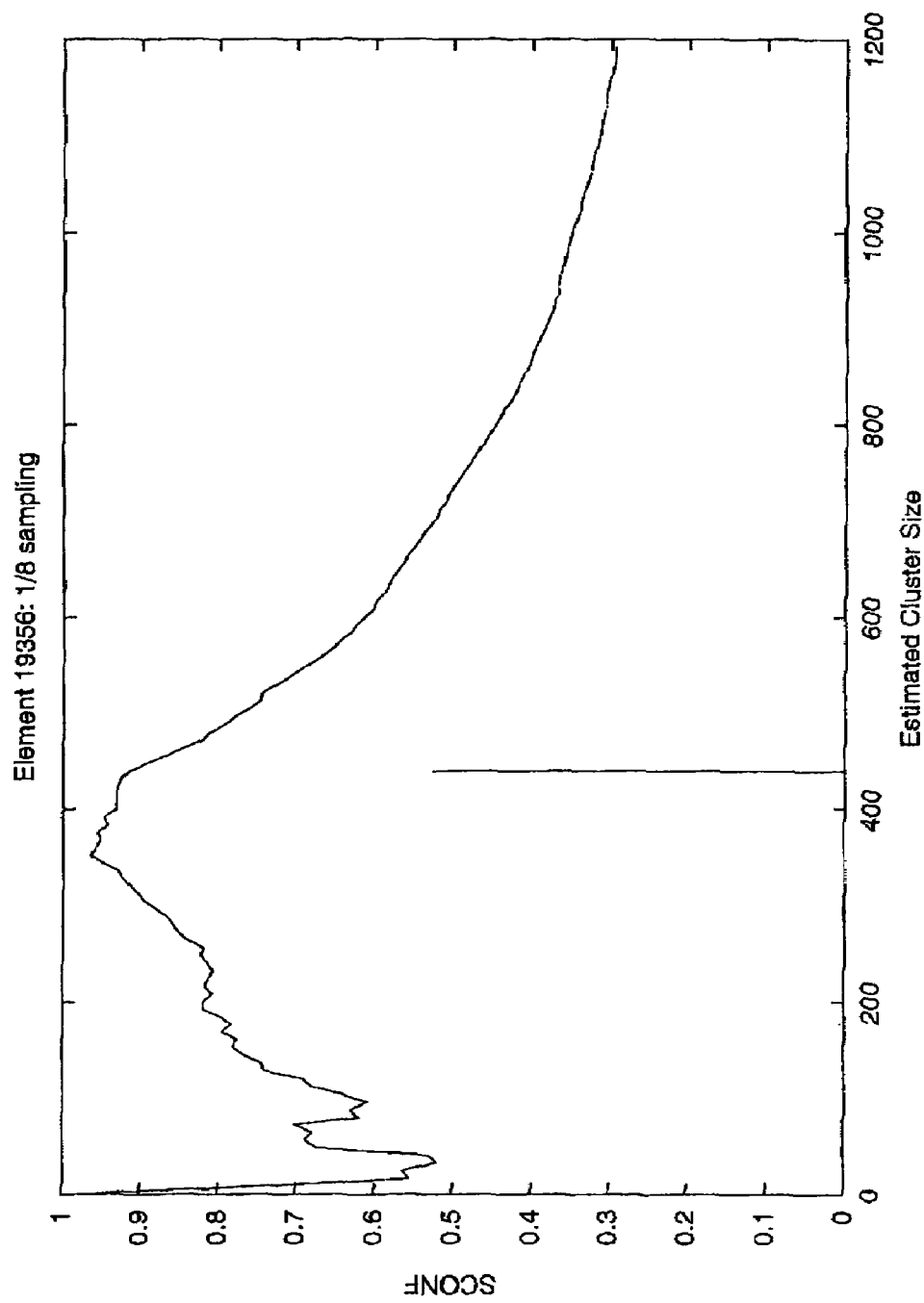
FIG. 21 is a plot of a profile of SCONF values versus estimated cluster size.

An example of a patch profile is illustrated in FIG. 21, for the case in which COV dimensional reduction was used. The profile is associated with a cluster produced by the Scenario A method.

The numbers of clusters produced under Scenario A with and with out the dimension reduction are listed in the table below.

TABLE 4

| Estimated Cluster Size (low-high) | No Dim-Reduction | COV Dim-Reduction |
|---|---|---|
| 6400-30720 | 1 | 1 |
| 3200-15360 | 1 | 2 |
| 1600-7680 | 8 | 8 |
| 800-3840 | 15 | 25 |
| 400-1920 | 32 | 50 |
| 200-960 | 70 | 84 |
| 100-480 | 206 | 135 |
| 50-240 | 405 | 216 |
| 25-120 | 760 | 356 |

The dimensional-reduction variant finds fewer minor clusters compared to the basic variant, but larger clusters. Experimentation also revealed that the dimensional-reduction variant produced query cluster graphs with richer interconnections, and was better able to resolve keyword polysemies.

The method according to the present invention may be implemented as a computer executable program, and the computer program according to the present invention may be written in a language such as the C language, the C++ language, Java (trade mark), or any other object-oriented language. The program according to the present invention may be stored in a storage medium such as a floppy disk (trade mark), a magnetic tape, a hard disk, a CD-ROM, a DVD, a magneto-optic disk or the like whereto data may be written and wherefrom data may be read which is readable by a computer.

The clustering method described herein is able to efficiently detect well-associated and well-differentiated clusters of sizes as low as 0.05% of the database, on an ordinary computer. The methods require no a priori assumptions concerning the number of clusters in the set. The methods also allow clusters to be generated taking only local influences into account. Overlapping clusters are also permitted. These features allow minor clusters to be discovered in a way that is impractical or even impossible for traditional methods.

The proposed clustering method can generate meaningful major and minor clusters in the vicinity of a query efficiently, without paying the excessive cost of computing a full clustering of the set. To the best of my knowledge, this is the first practical method for doing so for large text databases.

Very few clustering methods allow for the possibility of overlapping clusters. The proposed method uses cluster overlap to establish correspondences between clusters, and thereby produce a "cluster map" or graph of related concepts that can be navigated by the user. Unlike concept hierarchies, the relationships are established among groups of data elements themselves, rather than by classifications within the attribute space. Organization according to overlapping clusters of data elements allows for much more flexibility in the concepts that can be represented—in particular, minor clusters in the intersection of two or more major clusters can be discovered using the proposed method.

RSCONF values and patch profiles are techniques that not only serve to identify and compare clusters, they are also the means by which users can assess the level of association within a cluster, and its differentiation with the elements in its vicinity. Patch profiles can effectively complement existing spatial representation methods for the visualization of higher-dimensional text clusters.

Unlike most partition-based algorithms, the proposed query-based clustering method does not require previous knowledge or assumptions regarding the distribution of the data—it does not matter whether the data is uniformly distributed or has great variations in distribution. This applies even as regards the generation of nearest-neighbor lists, in that the SASH also has this feature.

When a SASH structure is used for approximate similarity queries, the asymptotic time required by PatchCluster for a total clustering of data set S is in $O(|S|\log 2|S|+c2)$, where c is the number of clusters produced (typically much smaller than $|S|$). The former term covers the cost of producing profiles and ranking candidate query clusters according to their RSCONF values. The elimination of duplicate clusters and the generation of graph edges can all be performed in $O(|S|+c \log 2|S|+c2)$ time.

The bottleneck in the construction of a query cluster graph lies in the precomputation of nearest-neighbor patches. However, the clustering method does not require perfectly-accurate nearest-neighbor lists in order to detect approximate cluster boundaries and overlaps. It is far more cost effective to use one of the emerging techniques, such as the SASH, for fast generation of approximately-correct nearest-neighbor lists instead. For the L.A. Times news article data set using COV dimensional reduction, the SASH offers speedups of roughly 40 times over sequential search at almost 95% accuracy. The asymptotic complexity of precomputing patches is dominated by the total cost of the SASH operations, which is in $O(|S|\log 2|S|)$.

Hereinabove, the present invention has been explained using particular embodiments depicted in the drawings. Of course, it is appreciated by a person skilled in the art that many alternative embodiments, modifications, and/or additions to the disclosed embodiments may be possible and therefore, the true scope of the present invention should be determined in accordance with the claims herewith.

I claim:

1. A computer system for generating data structures for information retrieval of documents stored in a database, said documents being stored as document-keyword vectors generated from a predetermined keyword list, and said document-keyword vectors forming nodes of a hierarchical structure imposed upon said documents, said computer system comprising:
   a processor having accessed to the database;
   a document-keyword matrix generation subsystem;
   a neighborhood patch generation subsystem for generating groups of nodes having similarities as determined using a search structure, said neighborhood patch generation subsystem including a subsystem for generating a spatial approximation sample hierarchy structure upon said document-keyword vectors and a patch defining subsystem for creating patch relationships among said nodes with respect to a metric distance between nodes;
   a query vector generation subsystem accepting search conditions and query keywords, generating a corresponding query vector, and storing the generated query vector;
   an intra-patch confidence and inter-patch confidence determination subsystem for every element of the database, the spatial approximation sample hierarchy structure computing a neighborhood patch consisting of a list of those database elements most similar to it for computing inter-patch confidence values between patches and intra-patch confidence values;
   a self confidence determining subsystem for (a) computing a list of self confidence values, for every stored patch, (b) computing relative self confidence values, and (c) thereafter using the relative self confidence values to determine a size of a best subset of each patch to serve as a cluster candidate;
   a cluster estimation subsystem for generating cluster data of said document-keyword-vectors using said similarities of patches wherein the cluster estimation subsystem selects said patches depending on-intra-patch confidence values to represent clusters of said document keyword vectors, estimate the sizes of said patches, and generate cluster data of document keyword vectors using similarities of the patches;
   a redundant cluster elimination subsystem for using inner patch confidence values to eliminate redundant cluster candidates; and
   a display subsystem for displaying on screen said estimated clusters together with confidence relations between said clusters and hierarchical information pertaining to cluster size.

2. The computer system of claim 1, wherein said cluster estimation subsystem selects said patches depending on said inner-patch confidence values to represent clusters of said document-keyword vectors.

3. The computer system of claim 1, wherein said cluster estimation subsystem estimates sizes of said clusters depending on said intra-patch confidence values.

4. A method for generating data structures for information retrieval of documents stored in a database, said documents being stored as document-keyword vectors generated from a predetermined keyword list, and said document-keyword vectors forming nodes of a hierarchical structure imposed upon said documents, said method comprising the step of:
   generating a hierarchical structure upon said document-keyword vectors and storing hierarchy data in an adequate storage area;
   generating neighborhood patches of nodes having similarities as determined using levels of the hierarchical structure, and storing said patches in an adequate storage area;
   generating groups of nodes having similarities as determined using a search structure, including generating a spatial approximation sample hierarchy structure upon said document-keyword vectors and creating patch relationships among said nodes with respect to a metric distance between nodes;
   determining inter-patch confidence values between patches and intra-patch confidence values;
   determining an intra-patch confidence and inter-patch confidence for every element of the database, comprising utilizing the spatial approximation sample hierarchy structure to compute a neighborhood patch consisting of a list of those database elements most similar to it and computing inter-patch confidence values between patches and intra-patch confidence values;
   determining self confidence values to determine a size of a best subset of each patch to serve as a cluster candidate by the steps of (a) computing a list of self confidence values, for every stored patch, (b) computing relative self confidence values, and (c) thereafter using the relative self confidence values to determine the size of a best subset of each patch to serve as a cluster candidate;
   invoking said hierarchy data and said patches to compute inter-patch confidence values between said patches and intra-patch confidence values, and storing said values as corresponding lists in an adequate storage area;
   estimating the sizes of said patches, and generating cluster data of document-keyword vectors using similarities of the patches, selecting said patches depending on said inter-patch confidence values and said intra-patch confidence values to represent clusters of said document-keyword vectors; and
   using inner patch confidence values to eliminate redundant cluster candidates and
   displaying on screen said estimated clusters together with confidence relations between said clusters and hierarchical information pertaining to cluster size.

5. The method according to claim 4 further comprising the step of estimating sizes of said clusters depending on said intra-patch confidence values.

6. A computer-readable storage medium storing a program for making a computer system execute a method for generating data structures for information retrieval of documents stored in a database, said documents being stored as document-keyword vectors generated from a predetermined keyword list, and said document-keyword vectors forming nodes of a hierarchical structure imposed upon said documents, said program making said computer system execute the steps of:
   accepting search conditions and query keywords, generating a corresponding query vector, and storing the generated query vector;
   generating a hierarchical structure upon said document-keyword vectors and storing hierarchy data in an adequate storage area;

generating neighborhood patches consisting of nodes having similarities as determined using levels of the hierarchical structure, and storing said patch list in an adequate storage area;

generating groups of nodes having similarities as determined using a search structure, including generating a spatial approximation sample hierarchy structure upon said document-keyword vectors and creating patch relationships among said nodes with respect to a metric distance between nodes;

determining an intra-patch confidence and inter-patch confidence for every element of the database, comprising utilizing the spatial approximation sample hierarchy structure to compute a neighborhood patch consisting of a list of those database elements most similar to it and computing inter-patch confidence values between patches and inter-patch confidence values;

determining self confidence values to determine a size of a best subset of each patch to serve as a cluster candidate by the steps of (a) computing a list of self confidence values, for every stored patch, (b) computing relative self confidence values, and (c) thereafter using the relative self confidence values to determine the size of a best subset of each patch to serve as a cluster candidate;

invoking said hierarchy data and said patches to compute inter-patch confidence values between said patches and intra-patch confidence values, and storing said values as corresponding lists in an adequate storage area;

selecting said patches depending on said inter-patch confidence values and said intra-patch confidence values to represent clusters of said document-keyword vectors;

using inner patch confidence values to eliminate redundant cluster candidates; and displaying on screen said estimated clusters together with confidence relations between said clusters and hierarchical information pertaining to cluster size.

7. The computer readable storage medium according to claim 6, further comprising the step of estimating sizes of said clusters depending on said intra-patch confidence values.

\* \* \* \* \*